United States Patent
Lee et al.

(10) Patent No.: US 11,363,248 B2
(45) Date of Patent: Jun. 14, 2022

(54) METHOD AND DEVICE FOR TRANSMITTING REGION INFORMATION OF 360-DEGREE VIDEO

(71) Applicant: LG ELECTRONICS INC., Seoul (KR)

(72) Inventors: Jangwon Lee, Seoul (KR); Sejin Oh, Seoul (KR); Hyunmook Oh, Seoul (KR); Soojin Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/494,749

(22) PCT Filed: Jul. 25, 2017

(86) PCT No.: PCT/KR2017/008015
§ 371 (c)(1),
(2) Date: Sep. 16, 2019

(87) PCT Pub. No.: WO2018/169139
PCT Pub. Date: Sep. 20, 2018

(65) Prior Publication Data
US 2020/0107006 A1    Apr. 2, 2020

Related U.S. Application Data

(60) Provisional application No. 62/472,629, filed on Mar. 17, 2017, provisional application No. 62/478,513, (Continued)

(51) Int. Cl.
*H04N 13/00* (2018.01)
*H04N 13/161* (2018.01)
(Continued)

(52) U.S. Cl.
CPC ......... *H04N 13/161* (2018.05); *H04N 13/178* (2018.05); *H04N 13/194* (2018.05);
(Continued)

(58) Field of Classification Search
CPC ... H04N 13/161; H04N 13/178; H04N 13/194
See application file for complete search history.

(56) References Cited

U.S. PATENT DOCUMENTS

2016/0165309 A1* 6/2016 Van Brandenburg ........................ H04N 21/6587 725/116
2017/0295356 A1* 10/2017 Abbas .................. H04N 5/2251
(Continued)

FOREIGN PATENT DOCUMENTS

KR       101212231         12/2012
KR   20130107263 A   *   10/2013   ........... H04N 21/854
(Continued)

OTHER PUBLICATIONS

Martin Řeřábek et al. "JPEG backward compatible coding of omnidirectional images," Proc. SPIE 9971, Applications of Digital Image Processing XXXIX, 99711O (Sep. 28, 2016); doi: 10.1117/12.2240281 (Year: 2016).*
(Continued)

*Primary Examiner* — Frank F Huang
(74) *Attorney, Agent, or Firm* — Lee, Hong, Degerman, Kang & Waimey PC

(57) ABSTRACT

A 360-degree video data processing method performed by a 360-degree video transmission device, according to the present invention, comprises the steps of: acquiring 360-degree video data; processing the 360-degree video data so as to acquire a 2D picture; dividing the 2D picture so as to derive sub-pictures; generating metadata for the 360-degree video data; encoding at least one of the sub-pictures; and
(Continued)

performing processing for storing or transmitting the encoded at least one sub-picture and the metadata, wherein the metadata includes position information of the sub-picture on the 2D picture.

10 Claims, 29 Drawing Sheets

Related U.S. Application Data filed on Mar. 29, 2017, provisional application No. 62/511,400, filed on May 26, 2017.

(51) Int. Cl.
*H04N 13/178* (2018.01)
*H04N 13/194* (2018.01)
*H04N 19/103* (2014.01)
*H04N 19/433* (2014.01)
*H04N 19/55* (2014.01)
*H04N 19/577* (2014.01)
*H04N 19/65* (2014.01)
*H04N 19/40* (2014.01)
*H04N 19/96* (2014.01)
*H04N 19/186* (2014.01)

(52) U.S. Cl.
CPC ......... *H04N 19/103* (2014.11); *H04N 19/186* (2014.11); *H04N 19/40* (2014.11); *H04N 19/433* (2014.11); *H04N 19/55* (2014.11); *H04N 19/577* (2014.11); *H04N 19/65* (2014.11); *H04N 19/96* (2014.11)

(56) References Cited

U.S. PATENT DOCUMENTS

2017/0339391 A1* 11/2017 Zhou ................... H04L 65/607
2018/0077210 A1* 3/2018 Hannuksela ........ H04L 65/4084

FOREIGN PATENT DOCUMENTS

| KR | 1020150058428 | | 5/2015 | | |
|---|---|---|---|---|---|
| KR | 20150068299 | A * | 6/2015 | ......... | H04N 5/23238 |
| KR | 1020160034282 | | 3/2016 | | |
| KR | 20170017700 | A * | 2/2017 | ............ | G03B 37/04 |
| WO | 2015197815 | | 12/2015 | | |

OTHER PUBLICATIONS

PCT International Application No. PCT/KR2017/008015, International Search Report dated Dec. 11, 2017, 4 pages.

\* cited by examiner

FIG. 14

Box Type:     'roco'
Container:    Visual sample entry
Mandatory:    No
Quantity:     Zero or one

Syntax
aligned(8) class RegionOriginalCoordinateBox extends FullBox('roco', 0, 0) {
    unsigned int(16) original_picture_width;
    unsigned int(16) original_picture_height;
    unsigned int(16) region_horizontal_left_offset;
    unsigned int(16) region_vertical_top_offset;
    unsigned int(16) region_width;
    unsigned int(16) region_height;
}

FIG. 16

Box Type: 'rttk'
Container: Scheme Information box ('schi')
Mandatory: No
Quantity: Zero or one

Syntax
```
aligned(8) class RegionToTrackBox extends FullBox('rttk', 0, 0) {
    unsigned int(8) num_regions;
    for (i=0; i<num_regions; i++) {
        unsigned int(16) region_horizontal_left_offset;
        unsigned int(16) region_vertical_top_offset;
        unsigned int(16) region_width;
        unsigned int(16) region_height;
        unsigned int(32) track_ID;
    }
}
```

FIG. 17

```
mcts_extraction_info_set( ) {                                                                    Descriptor
    num_extraction_info_sets_minus1                                                              ue(v)
    for( i = 0; i <= num_extraction_information_sets_minus1; i++ ) {
        num_associated_tile_set_identifiers_minus1 [ i ]                                         ue(v)
        for( j = 0; j <= num_associated_tile_set_identifiers_minus1[ i ]; j++ )
            mcts_identifier [ i ][ j ]                                                           ue(v)
        num_vps_in_extraction_info_set_minus1[ i ]                                               ue(v)
        for( j = 0; j <= num_vps_in_extraction_set_minus1[ i ]; j++ )
            vps_rbsp_data_length [ i ][ j ]                                                      ue(v)
        num_sps_in_extraction_info_set_minus1[ i ]                                               ue(v)
        for( j = 0; j <= num_sps_in_extraction_set_minus1[ i ]; j++ )
            sps_rbsp_data_length [ i ][ j ]                                                      ue(v)
        num_pps_in_extraction_info_set_minus1[ i ]                                               ue(v)
        for( j = 0; j <= num_pps_in_extraction_set_minus1[ i ]; j++ )
            pps_rbsp_data_length [ i ][ j ]                                                      ue(v)
        num_sub_bs_region_coordinate_info_minus1 [ i ]                                           ue(v)
        for( j = 0; j <= num_sub_bs_region_coordinate_info_minus1 [ i ]; j++ )                   ue(v)
            sub_bs_region_coordinate_info_data_length     [ i ][ j ]                             ue(v)
        while( !byte_aligned() )
            mcts_alignment_bit_equal_to_zero                                                     f(1)
        for( j = 0; j <= num_vps_in_extraction_set_minus1[ i ]; j++ )
            for( k = 0; k <= vps_rbsp_data_length[ i ][ j ]; k++ )
                vps_rbsp_data_bytes[ i ][ j ][ k ]                                               u(8)
        for( j = 0; j <= num_sps_in_extraction_set_minus1[ i ]; j++ )
            for( k = 0; k <= sps_rbsp_data_length[ i ][ j ]; k++ )
                sps_rbsp_data_bytes[ i ][ j ][ k ]                                               u(8)
        for( j = 0; j <= num_pps_in_extraction_set_minus1[ i ]; j++ )
            for( k = 0; k <= pps_rbsp_data_length[ i ][ j ]; k++ )
                pps_rbsp_data_bytes[ i ][ j ][ k ]                                               u(8)
        for( j = 0; j <= num_ub_bs_region_coordinate_info_minus1[ i ]; j++ )
            for( k = 0; k <= sub_bs_region_coordinate_info_data_length[ i ][ j ]; k++ )
                sub_bs_region_coordinate_info_data_bytes[ i ][ j ][ k ]                          u(8)
    }
}
```

FIG. 18

| | Descriptor |
|---|---|
| mcts_sub_bitstream_region_in_original_picture_coordinate_info( ) { | |
| original_picture_width_in_luma_sample | ue(v) |
| original_picture_height_in_luma_sample | ue(v) |
| sub_bitstream_region_horizontal_left_offset_in_luma_sample | ue(v) |
| sub_bitstream_region_vertical_top_offset_in_luma_sample | ue(v) |
| sub_bitstream_region_width_in_luma_sample | ue(v) |
| sub_bitstream_region_height_in_luma_sample | ue(v) |
| } | |

FIG. 19

```
class TileRegionGroupEntry() extends VisualSampleGroupEntry ('trif')
{
        unsigned int(16) groupID;
        unsigned int(1) tile_region_flag;
        if (!tile_region_flag)
                bit(7)  reserved = 0;
        else {
                unsigned int(2) independent_idc;
                unsigned int(1) full_picture;
                unsigned int(1) filtering_disabled;
                unsigned int(1) has_dependency_list;
                bit(2)  reserved = 0;
                if (!full_picture) {
                        unsigned int(16) horizontal_offset;
                        unsigned int(16) vertical_offset;
                }
                unsigned int(16) region_width;
                unsigned int(16) region_height;
                if (has_dependency_list) {
                        unsigned int(16) dependency_tile_count;
                        for (i=1; i<= dependency_tile_count; i++)
                                unsigned int(16) dependencyTileGroupID;
                }
                else {
                        unsigned int(8) numOfArrays;
                        for (j=0; j < numOfArrays; j++) {
                                unsigned int(1) array_completeness;
                                bit(1) reserved = 0;
                                unsigned int(6) NAL_unit_type;
                                unsigned int(16) numNalus;
                                for (i=0; i< numNalus; i++) {
                                        unsigned int(16) nalUnitLength;
                                        bit(8*nalUnitLength) nalUnit;
                                }
                        }
                }
        }
}
```

FIG. 21

```
Box Type:    'rofm'
Container:   Visual sample entry
Mandatory:   No
Quantity: Zero or one
Syntax
aligned(8) class RegionOnFrameBox extends FullBox('rofm', 0, 0) {
    unsigned int(32)   ori_pic_width;
    unsigned int(32)   ori_pic_height;
    bit(7)             reserved = 0;
    unsigned int(1)    sub_pic_reg_flag;
    if (sub_region_flag == 0) {
        unsigned int(32)   sub_pic_on_ori_pic_top;
        unsigned int(32)   sub_pic_on_ori_pic_left;
    }
    else {
        unsigned int(8)    num_sub_pic_regions;
        for (i = 0; i < num_sub_pic_regions; i++) {
            unsigned int(32) sub_pic_reg_top[i];
            unsigned int(32) sub_pic_reg_left[i];
            unsigned int(32) sub_pic_reg_width[i];
            unsigned int(32) sub_pic_reg_height[i];
            unsigned int(32) sub_pic_reg_on_ori_pic_top[i];
            unsigned int(32) sub_pic_reg_on_ori_pic_left[i];
        }
    }
}
```

FIG. 24

7.1.1.2 Syntax
aligned(8) class SubPictureCompositionBox extends TrackGroupTypeBox('spco') {
    unsigned int(16) reigon_x;
    unsigned int(16) region_y;
    unsigned int(16) region_width;
    unsigned int(16) region_height;
    unsigned int(16) composition_width;
    unsigned int(16) composition_height;
}

FIG. 25

```
aligned(8) class RegionWisePackingBox extends FullBox('rwpk', 0, 0) {
      RegionWisePackingStruct();
} aligned(8) class RegionWisePackingStruct {
      unsigned int(8) num_regions;
      unsigned int(16) proj_picture_width;
      unsigned int(16) proj_picture_height;
      for (i = 0; i < num_regions; i++) {
            bit(3) reserved = 0;
            unsigned int(1) guard_band_flag[i];
            unsigned int(4) packing_type[i];
            if (guard_band_flag[i]) {
                  unsigned int(8) left_gb_width[i];
                  unsigned int(8) right_gb_width[i];
                  unsigned int(8) top_gb_height[i];
                  unsigned int(8) bottom_gb_height[i];
                  unsigned int(1) gb_not_used_for_pred_flag[i];
                  unsigned int(3) gb_type[i];
                  bit(4) reserved = 0;
            }
            if (packing_type[i] == 0)
                  RectRegionPacking(i);
      }
} aligned(8) class RectRegionPacking(i) {
      unsigned int(16) proj_reg_width[i];
      unsigned int(16) proj_reg_height[i];
      unsigned int(16) proj_reg_top[i];
      unsigned int(16) proj_reg_left[i];
      unsigned int(3)  transform_type[i];
      bit(5) reserved = 0;
      unsigned int(16) packed_reg_width[i];
      unsigned int(16) packed_reg_height[i];
      unsigned int(16) packed_reg_top[i];
      unsigned int(16) packed_reg_left[i];
}
```

METHOD AND DEVICE FOR TRANSMITTING REGION INFORMATION OF 360-DEGREE VIDEO

BACKGROUND

Technical Field

The present disclosure relates to 360-degree video data processing and, more specifically, to a method and device for transmitting region information of 360-degree video.

Related Art

Virtual reality (VR) systems provide users with sensory experiences through which the users may feel as if they were in electronically projected environments. A system for providing VR may be further improved in order to provide higher-quality images and spatial sound. VR systems may enable users to interactively enjoy VR content.

360-degree video can be used on the three-dimension (3D) for VR systems and may be projected to two-dimensional (2D) pictures and processed according to various methods. There is a need for methods for efficient data processing and transmission with respect to 360-degree video.

SUMMARY

An object of the present disclosure is to provide a VR video data processing method and device for providing a VR system.

Another object of the present disclosure is to provide a method and device for transmitting 360-degree video data and metadata with respect to 360-degree video data.

Another object of the present disclosure is to provide a method and device for independently processing a region of 360-degree video.

Another object of the present disclosure is to provide a method and device for configuring a sub-picture of 360-degree video.

Another object of the present disclosure is to provide a method and device generating and transmitting metadata with respect to a sub-picture.

According to an embodiment of the present disclosure, a 360-degree video processing method performed by a 360-degree video transmission device is provided. The method includes: acquiring 360-degree video data; processing the 360-degree video data to acquire a 2D picture; dividing the 2D picture to derive sub-pictures; generating metadata with respect to the 360-degree video data; encoding at least one of the sub-pictures; and performing processing for storing or transmitting the at least one encoded sub-picture and the metadata, wherein the metadata includes positional information of a sub-picture on the 2D picture.

According to another embodiment of the present disclosure, a 360-degree video transmission device which processes 360-degree video data is provided. The 360-degree video transmission device includes: a data input unit for acquiring 360-degree video data; a projection processor for processing the 360-degree video data to acquire a 2D picture and dividing the 2D picture to derive sub-pictures; a metadata processor for generating metadata with respect to the 360-degree video data; a data encoder for encoding at least one of the sub-pictures; and a transmission processor for performing processing for storing or transmitting the at least one encoded sub-picture and the metadata, wherein the metadata includes positional information of a sub-picture on the 2D picture.

According to another embodiment of the present disclosure, a 360-degree video processing method performed by a 360-degree video reception device is provided. The method is a 360-degree video processing method performed by a 360-degree video reception device and includes: receiving a signal including a track and metadata with respect to at least one sub-picture; processing the signal to acquire video information and the metadata with respect to the sub-picture; decoding the sub-picture based on the video information with respect to the sub-picture; and processing the decoded sub-picture based on the metadata to render the sub-picture on a 3D space, wherein the metadata includes positional information of the sub-picture on a 2D picture.

According to another embodiment of the present disclosure, a 360-degree video reception device which processes 360-degree video data is provided. The 360-degree video reception device includes: a receiver for receiving a signal including a track and metadata with respect to at least one sub-picture; a reception processor for processing the signal to acquire video information and the metadata with respect to the sub-picture; a data decoder for decoding the sub-picture based on the video information with respect to the sub-picture; and a renderer for processing the decoded sub-picture based on the metadata to render the sub-picture on a 3D space, wherein the metadata includes positional information of the sub-picture on a 2D picture.

According to the present disclosure, it is possible to efficiently transmit 360 content in environments supporting next-generation hybrid broadcast using terrestrial broadcast networks and the Internet.

According to the present disclosure, it is possible to provide a method for providing interactive experience when a user consumes 360 content.

According to the present disclosure, it is possible to efficiently increase transmission capacity and transmit necessary information in transmission of 360 content.

According to the present disclosure, it is possible to efficiently extract a sub-picture from 360-degree video data and independently process the sub-picture to improve overall transmission and processing efficiency.

BRIEF DESCRIPTION OF THE DRAWINGS

FIG. 14 illustrates RegionOriginalCoordninateBox.

FIG. 16 illustrates RegionToTrackBox according to an embodiment of the present disclosure.

FIG. 17 illustrates an SEI message according to an embodiment of the present disclosure.

FIG. 18 illustrates mcts_sub_bitstream_region_in_original_picture_coordinate_info according to an embodiment of the present disclosure.

FIG. 19 illustrates information related to an MCTS region in a file including a plurality of MCTS bitstreams according to an embodiment of the present disclosure.

FIG. 21 illustrates coverage information according to an embodiment of the present disclosure.

FIG. 24 illustrates the syntax of SubpictureCompositionBox.

FIG. 25 illustrates a hierarchical structure of RegionWisePackingBox.

DESCRIPTION OF EXEMPLARY EMBODIMENTS

Figure 1:
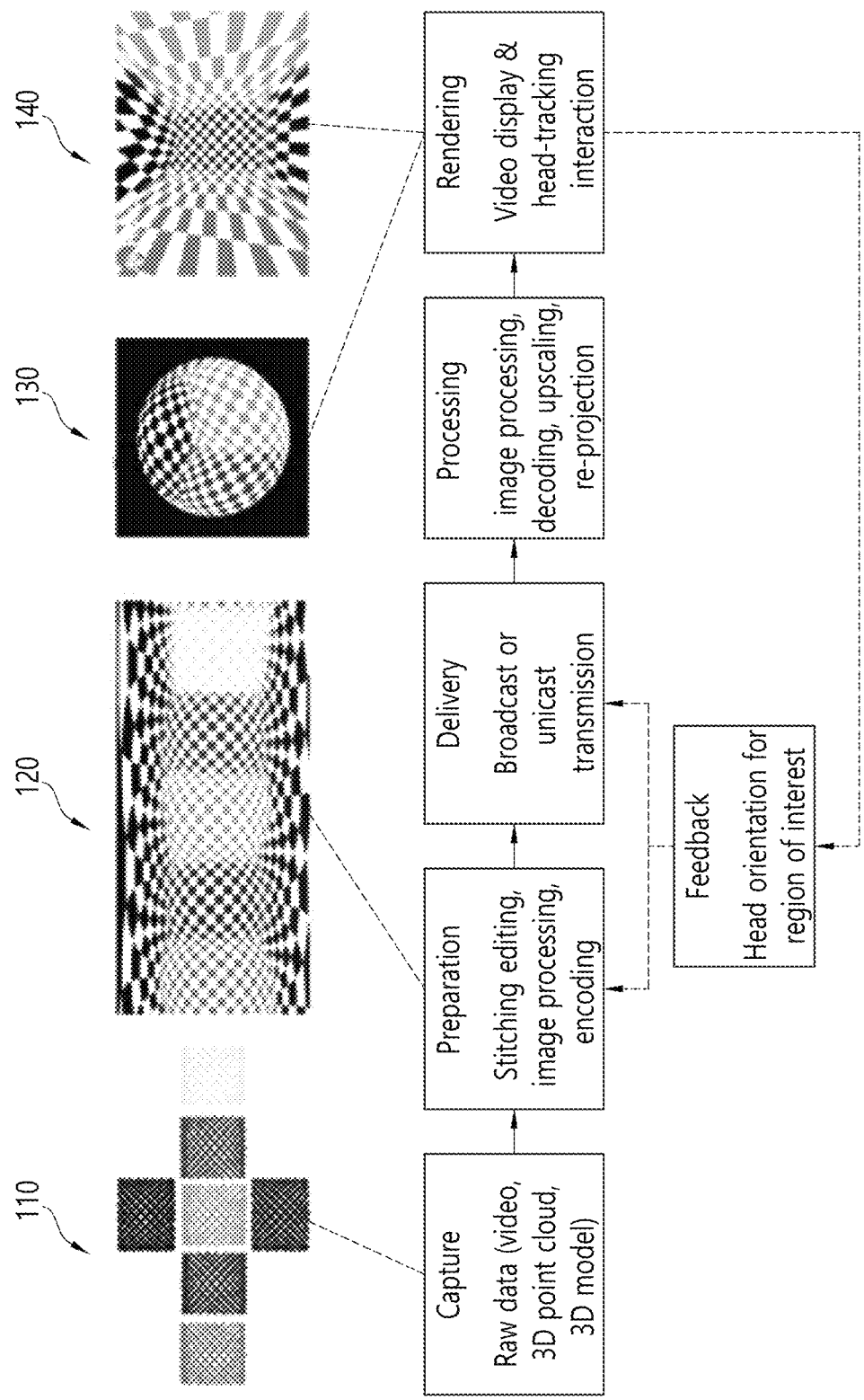
FIG. 1 is a view illustrating overall architecture for providing a 360-degree video according to the present disclosure.

The present disclosure may be modified in various forms, and specific examples thereof will be described and illustrated in the drawings. However, the examples are not intended for limiting the embodiment. The terms used in the following description are used to merely describe specific examples, but are not intended to limit the embodiment. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the example are independently drawn for the purpose of convenience for explanation of different specific functions, and do not mean that the elements are embodied by independent hardware or independent software. For example, two or more elements of the elements may be combined to form a single element, or one element may be divided into plural elements. The examples in which the elements are combined and/or divided belong to the embodiment without departing from the concept of the embodiment.

Hereinafter, preferred embodiments of the present disclosure will be described in more detail with reference to the attached drawings. Hereinafter, the same reference numbers will be used throughout this specification to refer to the same components and redundant description of the same component will be omitted.

FIG. 1 is a view illustrating overall architecture for providing a 360-degree video according to the present disclosure.

The present disclosure proposes a method of providing 360-degree content in order to provide virtual reality (VR) to users. VR may refer to technology for replicating actual or virtual environments or those environments. VR artificially provides sensory experience to users and thus users can experience electronically projected environments.

360-degree content refers to content for realizing and providing VR and may include a 360-degree video and/or 360-degree audio. The 360-degree video may refer to video or image content which is necessary to provide VR and is captured or reproduced omnidirectionally (360 degrees). Hereinafter, the 360 video may refer to 360-degree video or omnidirectional video. A 360-degree video may refer to a video or an image represented on 3D spaces in various forms according to 3D models. For example, a 360-degree video can be represented on a spherical surface. The 360-degree audio is audio content for providing VR and may refer to spatial audio content whose audio generation source can be recognized to be located in a specific 3D space. 360 audio may refer to 360-degree audio. 360-degree content may be generated, processed and transmitted to users and users can consume VR experiences using the 360-degree content.

Particularly, the present disclosure proposes a method for effectively providing a 360-degree video. To provide a 360-degree video, a 360-degree video may be captured through one or more cameras. The captured 360-degree video may be transmitted through series of processes and a reception side may process the transmitted 360-degree video into the original 360-degree video and render the 360-degree video. In this manner, the 360-degree video can be provided to a user.

Specifically, processes for providing a 360-degree video may include a capture process, a preparation process, a transmission process, a processing process, a rendering process and/or a feedback process.

The capture process may refer to a process of capturing images or videos for a plurality of viewpoints through one or more cameras. Image/video data (110) shown in FIG. 1 may be generated through the capture process. Each plane of (110) in FIG. 1 may represent an image/video for each viewpoint. A plurality of captured images/videos may be referred to as raw data. Metadata related to capture can be generated during the capture process.

For capture, a special camera for VR may be used. When a 360-degree video with respect to a virtual space generated by a computer is provided according to an embodiment, capture through an actual camera may not be performed. In this case, a process of simply generating related data can substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image (120) in FIG. 1.

Video data projected on the 2D image may be subjected to the region-wise packing process in order to improve video coding efficiency. Region-wise packing may refer to a process of processing video data projected on a 2D image for each region. Here, regions may refer to divided areas of a 2D image on which 360-degree video data is projected. Regions can be obtained by dividing a 2D image equally or arbitrarily according to an embodiment. Further, regions may be divided according to a projection scheme in an embodiment. The region-wise packing process is an optional process and may be omitted in the preparation process.

The processing process may include a process of rotating regions or rearranging the regions on a 2D image in order to improve video coding efficiency according to an embodiment. For example, it is possible to rotate regions such that specific sides of regions are positioned in proximity to each other to improve coding efficiency.

The processing process may include a process of increasing or decreasing resolution for a specific region in order to differentiate resolutions for regions of a 360-degree video according to an embodiment. For example, it is possible to increase the resolution of regions corresponding to relatively more important regions in a 360-degree video to be higher than the resolution of other regions. Video data projected on the 2D image or region-wise packed video data may be subjected to the encoding process through a video codec.

According to an embodiment, the preparation process may further include an additional editing process. In this editing process, editing of image/video data before and after projection may be performed. In the preparation process, metadata regarding stitching/projection/encoding/editing may also be generated. Further, metadata regarding an initial viewpoint or a region of interest (ROI) of video data projected on the 2D image may be generated.

The transmission process may be a process of processing and transmitting image/video data and metadata which have passed through the preparation process. Processing according to an arbitrary transmission protocol may be performed for transmission. Data which has been processed for transmission may be delivered through a broadcast network and/or a broadband. Such data may be delivered to a reception side in an on-demand manner. The reception side may receive the data through various paths.

The processing process may refer to a process of decoding received data and re-projecting projected image/video data on a 3D model. In this process, image/video data projected on the 2D image may be re-projected on a 3D space. This process may be called mapping or projection according to context. Here, 3D model to which image/video data is mapped may have different forms according to 3D models. For example, 3D models may include a sphere, a cube, a cylinder and a pyramid.

According to an embodiment, the processing process may additionally include an editing process and an up-scaling process. In the editing process, editing of image/video data before and after re-projection may be further performed. When the image/video data has been reduced, the size of the image/video data can be increased by up-scaling samples in the up-scaling process. An operation of decreasing the size through down-scaling may be performed as necessary.

The rendering process may refer to a process of rendering and displaying the image/video data re-projected on the 3D space. Re-projection and rendering may be combined and represented as rendering on a 3D model. An image/video re-projected on a 3D model (or rendered on a 3D model) may have a form (130) shown in FIG. 1. The form (130) shown in FIG. 1 corresponds to a case in which the image/video is re-projected on a 3D spherical model. A user can view a region of the rendered image/video through a VR display. Here, the region viewed by the user may have a form (140) shown in FIG. 1.

The feedback process may refer to a process of delivering various types of feedback information which can be acquired in a display process to a transmission side. Interactivity in consumption of a 360-degree video can be provided through the feedback process. According to an embodiment, head orientation information, viewport information representing a region currently viewed by a user, and the like can be delivered to a transmission side in the feedback process. According to an embodiment, a user may interact with an object realized in a VR environment. In this case, information about the interaction may be delivered to a transmission side or a service provider in the feedback process. According to an embodiment, the feedback process may not be performed.

The head orientation information may refer to information about the position, angle, motion and the like of the head of a user. Based on this information, information about a region in a 360-degree video which is currently viewed by the user, that is, viewport information, can be calculated.

The viewport information may be information about a region in a 360-degree video which is currently viewed by a user. Gaze analysis may be performed through the viewpoint information to check how the user consumes the 360-degree video, which region of the 360-degree video is gazed by the user, how long the region is gazed, and the like. Gaze analysis may be performed at a reception side and a result thereof may be delivered to a transmission side through a feedback channel. A device such as a VR display may extract a viewport region based on the position/direction of the head of a user, information on a vertical or horizontal field of view (FOY) supported by the device, and the like.

According to an embodiment, the aforementioned feedback information may be consumed at a reception side as well as being transmitted to a transmission side. That is, decoding, re-projection and rendering at the reception side may be performed using the aforementioned feedback information. For example, only a 360-degree video with respect to a region currently viewed by the user may be preferentially decoded and rendered using the head orientation information and/or the viewport information.

Here, a viewport or a viewport region may refer to a region in a 360-degree video being viewed by a user. A viewpoint is a point in a 360-degree video being viewed by a user and may refer to a center point of a viewport region. That is, a viewport is a region having a viewpoint at the center thereof, and the size and the shape of the region can be determined by an FOV which will be described later.

In the above-described overall architecture for providing a 360-degree video, image/video data which is subjected to the capture/projection/encoding/transmission/decoding/re-projection/rendering processes may be referred to as 360-degree video data. The term "360-degree video data" may be used as the concept including metadata and signaling information related to such image/video data.

To store and transmit media data such as the aforementioned audio and video data, a standardized media file format may be defined. According to an embodiment, a media file may have a file format based on ISO BMFF (ISO base media file format).

Figure 2:
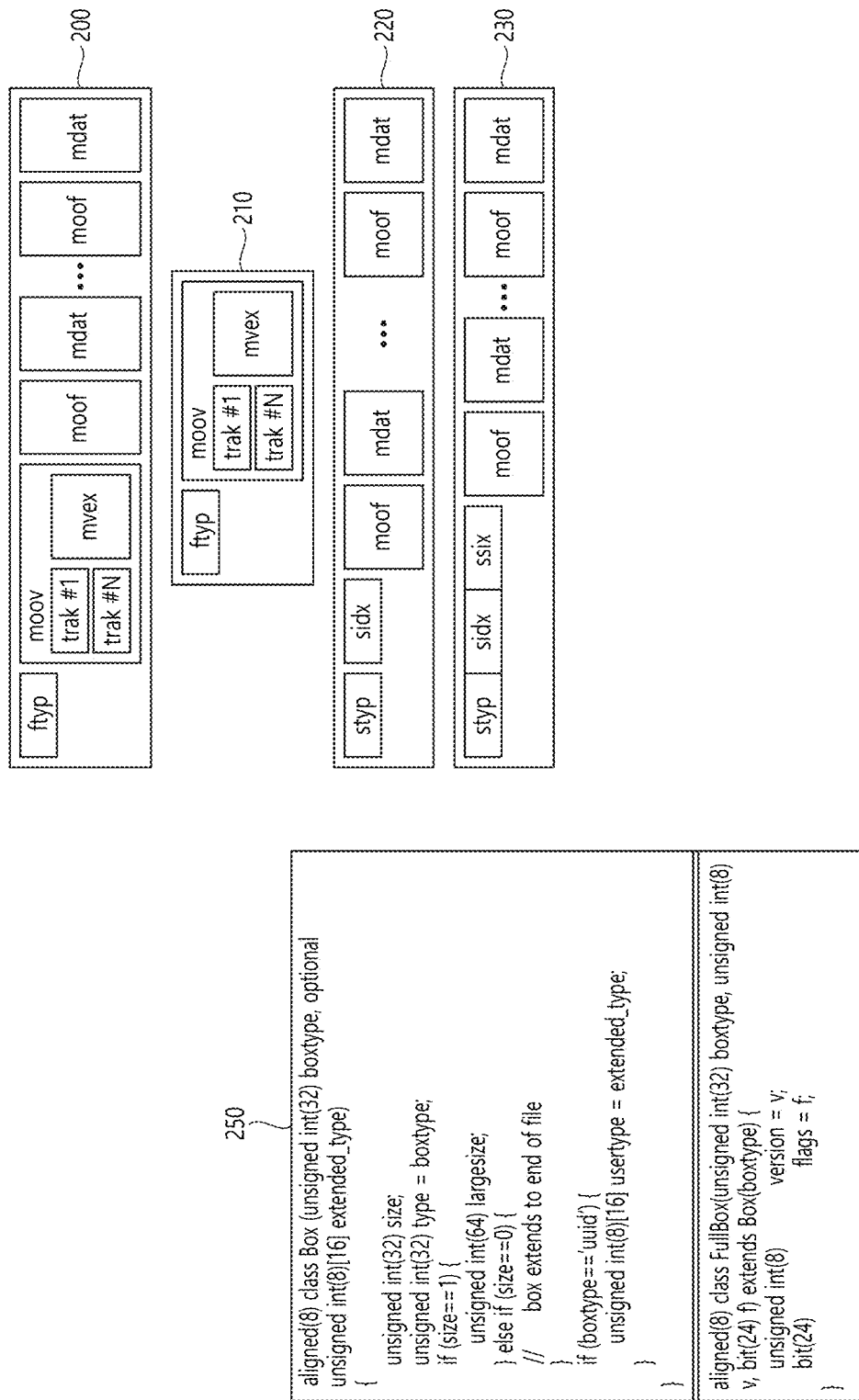
FIGS. 2 and 3 are views illustrating a structure of a media file according to an embodiment of the present disclosure.
Figure 3:
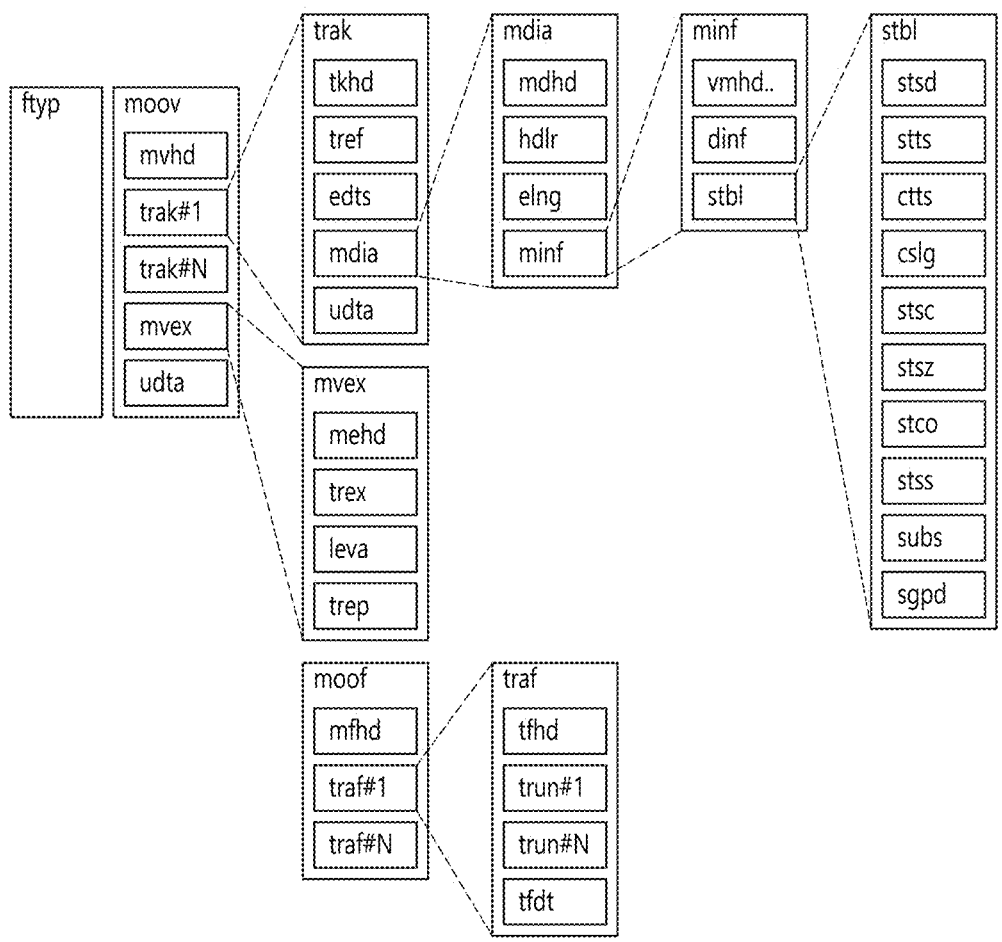

FIGS. 2 and 3 are views illustrating a structure of a media file according to an embodiment of the present disclosure.

The media file according to the present disclosure may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to the present disclosure may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file according to the present disclosure may be divided into a plurality of fragments (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment (210) may include information related to media decoder initialization except media data. This file may correspond to the aforementioned initialization segment, for example. The initialization segment can include the aforementioned ftyp box and/or moov box.

A file of the illustrated embodiment (220) may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment (230), an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment (250). In the present embodiment, a size field and a largesize field can represent the length of the corresponding box in bytes. A version field can indicate the version of the corresponding box format. A type field can indicate the type or identifier of the corresponding box. A flags field can indicate a flag associated with the corresponding box.

Meanwhile, fields (attributes) for 360-degree video according to the present disclosure may be comprised in DASH based adaptive streaming model and delivered.

Figure 4:
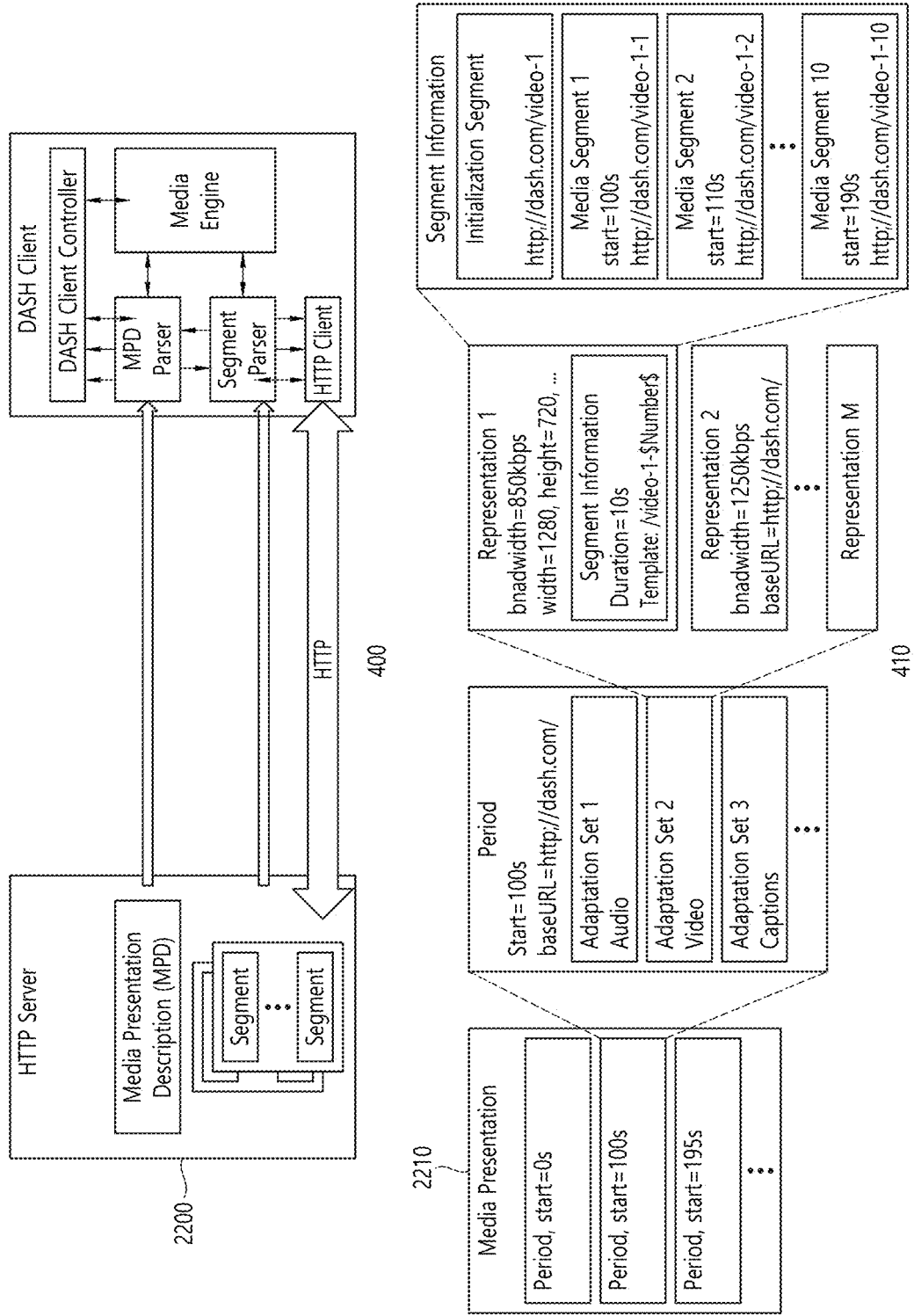
FIG. 4 illustrates an example of the overall operation of a DASH-based adaptive streaming model.

FIG. 4 illustrates an example of the overall operation of a DASH-based adaptive streaming model. The DASH-based adaptive streaming model according to an illustrated embodiment (400) illustrates an operation between an HTTP server and a DASH client. Here, Dynamic Adaptive Streaming over HTTP (DASH) is a protocol for supporting HTTP-based adaptive streaming and can dynamically support streaming according to a network state. Accordingly, AV content may be seamlessly reproduced.

First, the DASH client may acquire an MPD. The MPD may be delivered from a service provider, such as the HTTP server. The DASH client may request a segment from the server using segment access information described in the MPD. Here, this request may be performed in view of the network condition.

After acquiring the segment, the DASH client may process the segment in a media engine and may display the segment on a screen. The DASH client may request and acquire a necessary segment in view of reproduction time and/or the network state in real time (adaptive streaming). Accordingly, content may be seamlessly reproduced.

The media presentation description (MPD) is a file including detailed information for allowing the DASH client to dynamically acquire a segment and may be expressed in XML format.

A DASH client controller may generate a command to request an MPD and/or a segment in view of the network state. In addition, the controller may control acquired information to be used in an internal block, such as the media engine.

An MPD parser may parse the acquired MPD in real time. Accordingly, the DASH client controller can generate a command to acquire a required segment.

A segment parser may parse the acquired segment in real time. Depending on pieces of information included in the segment, internal blocks including the media engine may perform certain operations.

An HTTP client may request a required MPD and/or segment from the HTTP server. The HTTP client may also deliver an MPD and/or segment acquired from the server to the MPD parser or the segment parser.

The media engine may display content on a screen using media data included in the segment. Here, pieces of information of the MPD may be used.

A DASH data model may have a hierarchical structure (410). A media presentation may be described by the MPD. The MPD may describe a temporal sequence of a plurality of periods forming a media presentation. A period may represent one section of media content.

In one section, pieces of data may be included in adaptation sets. An adaptation set may be a collection of a plurality of media content components that can be exchanged with each other. An adaptation set may include a collection of representations. A representation may correspond to a media content component. Within one representation, content may be temporally divided into a plurality of segments, which may be for proper accessibility and delivery. The URL of each segment may be provided to enable access to each segment.

The MPD may provide information related to the media presentation, and a period element, an adaptation set element, and a presentation element may describe a period, an adaptation set, and a presentation, respectively. A representation may be divided into sub-representations, and a sub-representation element may describe a sub-representation.

Common properties/elements may be defined, which may be applied to (included in) an adaptation set, a representations, a sub-representation, or the like. Among the common properties/elements, there may be an essential property and/or a supplemental property.

The essential property may be information including elements that are considered essential in processing media presentation-related data. The supplemental property may be information including elements that may be used for processing the media presentation-related data. Descriptors to be described in the following embodiments may be defined and delivered in an essential property and/or a supplemental property when delivered via the MPD.

Figure 5:
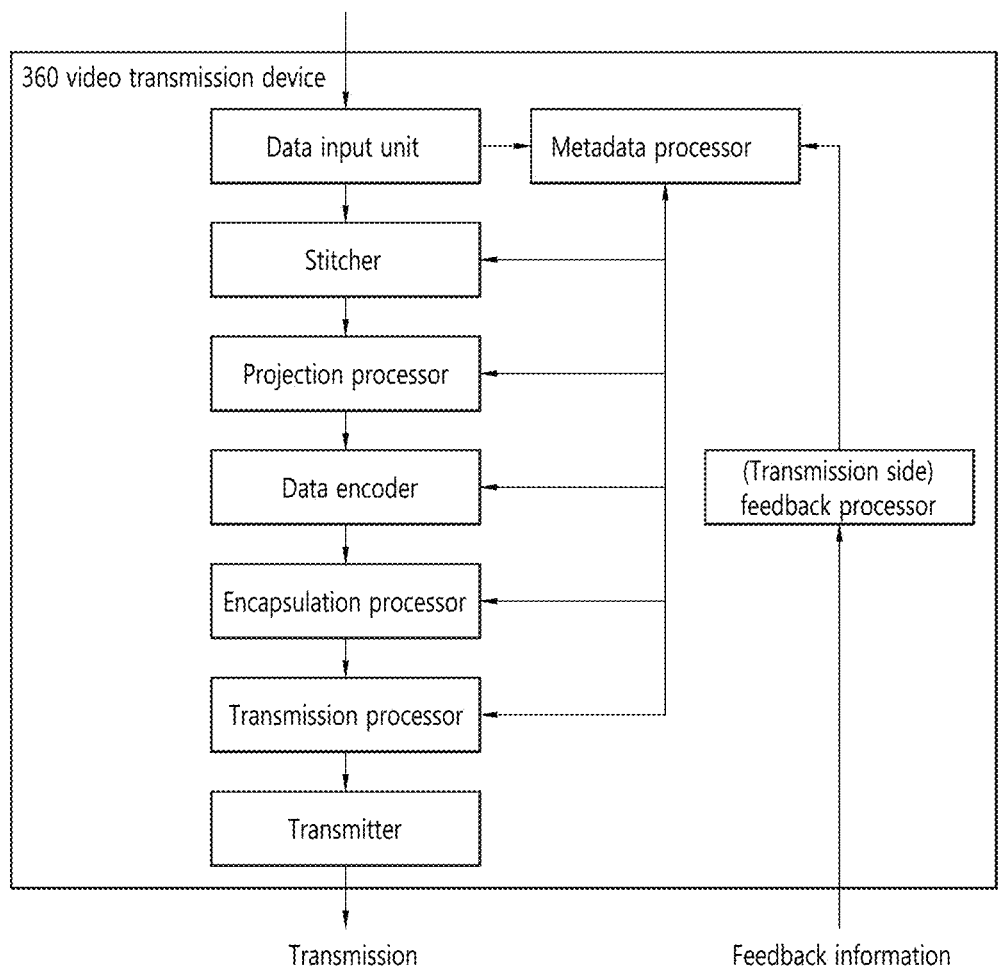
FIG. 5 is a view schematically illustrating a configuration of a 360-degree video transmission device to which the present disclosure is applicable.

FIG. 5 is a view schematically illustrating a configuration of a 360-degree video transmission device to which the present disclosure is applicable.

The 360-degree video transmission device according to the present disclosure can perform operations related the above-described preparation process and the transmission process. The 360-degree video transmission device may include a data input unit, a stitcher, a projection processor, a region-wise packing processor (not shown), a metadata processor, a (transmission side) feedback processor, a data encoder, an encapsulation processor, a transmission processor, and/or a transmitter as internal/external elements.

The data input unit can receive captured images/videos for respective viewpoints. The images/videos for the respective viewpoints may be images/videos captured by one or more cameras. Further, data input unit may receive metadata generated in a capture process. The data input unit may forward the received images/videos for the viewpoints to the stitcher and forward metadata generated in the capture process to the signaling processor.

The stitcher can perform a stitching operation on the captured images/videos for the viewpoints. The stitcher may forward stitched 360-degree video data to the projection processor. The stitcher may receive necessary metadata from the metadata processor and use the metadata for the stitching operation as necessary. The stitcher may forward metadata generated in the stitching process to the metadata processor. The metadata in the stitching process may include information such as information representing whether stitching has been performed, and a stitching type.

The projection processor can project the stitched 360-degree video data on a 2D image. The projection processor may perform projection according to various schemes which will be described later. The projection processor may perform mapping in consideration of the depth of 360-degree video data for each viewpoint. The projection processor may receive metadata necessary for projection from the metadata processor and use the metadata for the projection operation as necessary. The projection processor may forward metadata generated in the projection process to the metadata processor. Metadata generated in the projection processor may include a projection scheme type and the like.

The region-wise packing processor (not shown) can perform the aforementioned region-wise packing process. That is, the region-wise packing processor can perform the process of dividing the projected 360-degree video data (projected picture) into regions and rotating and rearranging regions or changing the resolution of each region. As described above, the region-wise packing process is optional and thus the region-wise packing processor may be omitted when region-wise packing is not performed. The result of the region-wise packing process for the projected picture can be referred to as packed picture. The projected picture can be treated as the packed picture when the region-wise packing processor is omitted. The region-wise packing processor may receive metadata necessary for region-wise packing from the metadata processor and use the metadata for a region-wise packing operation as necessary. The region-wise packing processor may forward metadata generated in the region-wise packing process to the metadata processor. Metadata generated in the region-wise packing processor may include a rotation degree, size and the like of each region.

The aforementioned stitcher, projection processor and/or the region-wise packing processor may be integrated into a single hardware component according to an embodiment.

The metadata processor can process metadata which may be generated in a capture process, a stitching process, a projection process, a region-wise packing process, an encoding process, an encapsulation process and/or a process for transmission. The metadata processor can generate 360-degree video-related metadata using such metadata. According to an embodiment, the metadata processor may generate the 360-degree video-related metadata in the form of a signaling table. 360-degree video-related metadata may also be called metadata or 360-degree video related signaling information according to signaling context. Further, the metadata processor may forward the acquired or generated metadata to internal elements of the 360-degree video transmission device as necessary. The metadata processor may forward the 360-degree video-related metadata to the data encoder, the encapsulation processor and/or the transmission processor such that the 360-degree video-related metadata can be transmitted to a reception side.

The data encoder can encode the 360-degree video data projected on the 2D image and/or region-wise packed 360-degree video data. The 360-degree video data can be encoded in various formats.

The encapsulation processor can encapsulate the encoded 360-degree video data and/or 360-degree video-related metadata in a file format. Here, the 360-degree video-related metadata may be received from the metadata processor. The encapsulation processor can encapsulate the data in a file format such as ISOBMFF, CFF or the like or process the data into a DASH segment or the like. The encapsulation processor may include the 360-degree video-related metadata in a file format. The 360-degree video-related metadata may be included in a box having various levels in SOBMFF or may be included as data of a separate track in a file, for example. According to an embodiment, the encapsulation processor may encapsulate the 360-degree video-related metadata into a file. The transmission processor may perform processing for transmission on the encapsulated 360-degree video data according to file format. The transmission processor may process the 360-degree video data according to an arbitrary transmission protocol. The processing for transmission may include processing for delivery over a broadcast network and processing for delivery over a broadband. According to an embodiment, the transmission processor may receive 360-degree video-related metadata from the metadata processor as well as the 360-degree video data and perform the processing for transmission on the 360-degree video-related metadata.

The transmitter can transmit the 360-degree video data and/or the 360-degree video-related metadata processed for transmission through a broadcast network and/or a broadband. The transmitter may include an element for transmission through a broadcast network and/or an element for transmission through a broadband.

According to an embodiment of the 360-degree video transmission device according to the present disclosure, the 360-degree video transmission device may further include a data storage unit (not shown) as an internal/external element. The data storage unit may store encoded 360-degree video data and/or 360-degree video-related metadata before the encoded 360-degree video data and/or 360-degree video-related metadata are delivered to the transmission processor. Such data may be stored in a file format such as ISOBMFF. Although the data storage unit may not be required when 360-degree video is transmitted in real time, encapsulated 360-degree data may be stored in the data storage unit for a certain period of time and then transmitted when the encapsulated 360-degree data is delivered over a broadband.

According to another embodiment of the 360-degree video transmission device according to the present disclosure, the 360-degree video transmission device may further include a (transmission side) feedback processor and/or a network interface (not shown) as internal/external elements. The network interface can receive feedback information from a 360-degree video reception device according to the present disclosure and forward the feedback information to the transmission side feedback processor. The transmission side feedback processor can forward the feedback information to the stitcher, the projection processor, the region-wise packing processor, the data encoder, the encapsulation processor, the metadata processor and/or the transmission processor. According to an embodiment, the feedback information may be delivered to the metadata processor and then delivered to each internal element. Internal elements which have received the feedback information can reflect the feedback information in the following 360-degree video data processing.

According to another embodiment of the 360-degree video transmission device according to the present disclosure, the region-wise packing processor may rotate regions and map the rotated regions on a 2D image. Here, the regions may be rotated in different directions at different angles and mapped on the 2D image. Region rotation may be performed in consideration of neighboring parts and stitched parts of 360-degree video data on a spherical surface before projection. Information about region rotation, that is, rotation directions, angles and the like may be signaled through 360-degree video-related metadata. According to another embodiment of the 360-degree video transmission device according to the present disclosure, the data encoder may perform encoding differently for respective regions. The data encoder may encode a specific region in high quality and encode other regions in low quality. The transmission side feedback processor may forward feedback information received from the 360-degree video reception device to the data encoder such that the data encoder can use encoding methods differentiated for respective regions. For example, the transmission side feedback processor may forward viewport information received from a reception side to the data encoder. The data encoder may encode regions including an area indicated by the viewport information in higher quality (UHD and the like) than that of other regions.

According to another embodiment of the 360-degree video transmission device according to the present disclosure, the transmission processor may perform processing for transmission differently for respective regions. The transmission processor may apply different transmission parameters (modulation orders, code rates, and the like) to the respective regions such that data delivered to the respective regions have different robustnesses.

Here, the transmission side feedback processor may forward feedback information received from the 360-degree video reception device to the transmission processor such that the transmission processor can perform transmission processes differentiated for respective regions. For example, the transmission side feedback processor may forward viewport information received from a reception side to the transmission processor. The transmission processor may perform a transmission process on regions including an area indicated by the viewport information such that the regions have higher robustness than other regions.

The above-described internal/external elements of the 360-degree video transmission device according to the present disclosure may be hardware elements. According to an embodiment, the internal/external elements may be changed, omitted, replaced by other elements or integrated.

Figure 6:
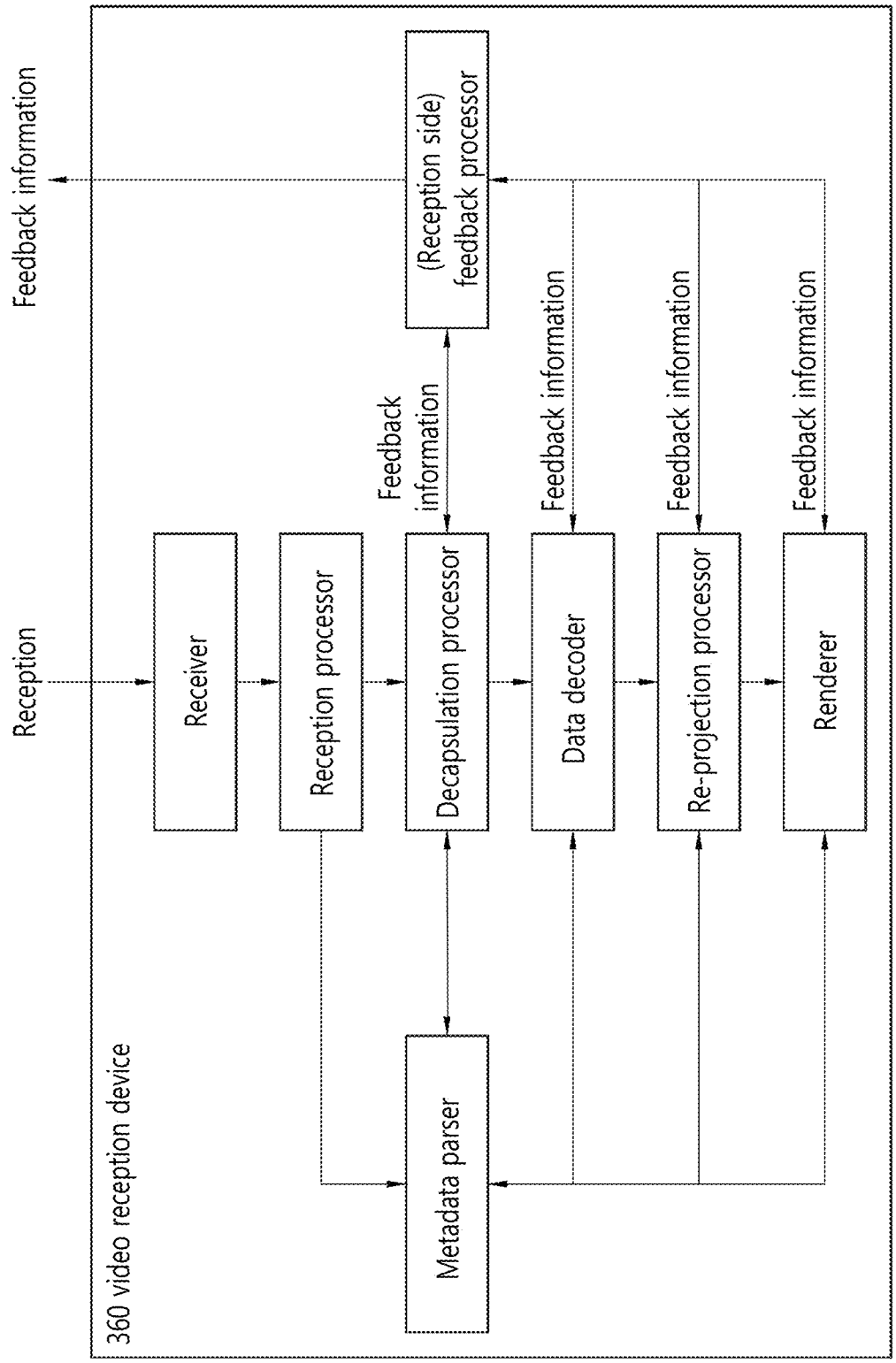
FIG. 6 is a view schematically illustrating a configuration of a 360-degree video reception device to which the present disclosure is applicable.

FIG. 6 is a view schematically illustrating a configuration of a 360-degree video reception device to which the present disclosure is applicable.

The 360-degree video reception device according to the present disclosure can perform operations related to the above-described processing process and/or the rendering process. The 360-degree video reception device may include a receiver, a reception processor, a decapsulation processor, a data decoder, a metadata parser, a (reception side) feedback processor, a re-projection processor, and/or a renderer as internal/external elements. A signaling parser may be called the metadata parser.

The receiver can receive 360-degree video data transmitted from the 360-degree video transmission device according to the present disclosure. The receiver may receive the 360-degree video data through a broadcast network or a broadband depending on a channel through which the 360-degree video data is transmitted.

The reception processor can perform processing according to a transmission protocol on the received 360-degree video data. The reception processor may perform a reverse process of the process of the aforementioned transmission processor such that the reverse process corresponds to processing for transmission performed at the transmission side. The reception processor can forward the acquired 360-degree video data to the decapsulation processor and forward acquired 360-degree video-related metadata to the metadata parser. The 360-degree video-related metadata acquired by the reception processor may have the form of a signaling table.

The decapsulation processor can decapsulate the 360-degree video data in a file format received from the reception processor. The decapsulation processor can acquired 360-degree video data and 360-degree video-related metadata by decapsulating files in ISOBMFF or the like. The decapsulation processor can forward the acquired 360-degree video data to the data decoder and forward the acquired 360-degree video-related metadata to the metadata parser. The 360-degree video-related metadata acquired by the decapsulation processor may have the form of a box or a track in a file format. The decapsulation processor may receive metadata necessary for decapsulation from the metadata parser as necessary.

The data decoder can decode the 360-degree video data. The data decoder may receive metadata necessary for decoding from the metadata parser. The 360-degree video-related metadata acquired in the data decoding process may be forwarded to the metadata parser.

The metadata parser can parse/decode the 360-degree video-related metadata. The metadata parser can forward acquired metadata to the data decapsulation processor, the data decoder, the re-projection processor and/or the renderer.

The re-projection processor can perform re-projection on the decoded 360-degree video data. The re-projection processor can re-project the 360-degree video data on a 3D space. The 3D space may have different forms depending on 3D models. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360-degree video data corresponding to a specific area of the 3D space on the 3D space using metadata necessary for re-projection.

The renderer can render the re-projected 360-degree video data. As described above, re-projection of 360-degree video data on a 3D space may be represented as rendering of 360-degree video data on the 3D space. When two processes simultaneously occur in this manner, the re-projection processor and the renderer may be integrated and the renderer may perform the processes. According to an embodiment, the renderer may render only a part viewed by a user according to viewpoint information of the user.

The user may view a part of the rendered 360-degree video through a VR display or the like. The VR display is a device which reproduces a 360-degree video and may be included in a 360-degree video reception device (tethered) or connected to the 360-degree video reception device as a separate device (un-tethered).

According to an embodiment of the 360-degree video reception device according to the present disclosure, the 360-degree video reception device may further include a (reception side) feedback processor and/or a network interface (not shown) as internal/external elements. The reception side feedback processor can acquire feedback information from the renderer, the re-projection processor, the data decoder, the decapsulation processor and/or the VR display and process the feedback information. The feedback information may include viewport information, head orientation information, gaze information, and the like. The network interface can receive the feedback information from the reception side feedback processor and transmit the feedback information to a 360-degree video transmission device.

As described above, the feedback information may be consumed at the reception side as well as being transmitted to the transmission side. The reception side feedback processor may forward the acquired feedback information to internal elements of the 360-degree video reception device such that the feedback information is reflected in processes such as rendering. The reception side feedback processor can forward the feedback information to the renderer, the re-projection processor, the data decoder and/or the decapsulation processor. For example, the renderer can preferentially render an area viewed by the user using the feedback information. In addition, the decapsulation processor and the data decoder can preferentially decapsulate and decode an area being viewed or will be viewed by the user.

The above-described internal/external elements of the 360-degree video reception device according to the present disclosure may be hardware elements. According to an embodiment, the internal/external elements may be changed, omitted, replaced by other elements or integrated. According to an embodiment, additional elements may be added to the 360-degree video reception device.

Figure 7:
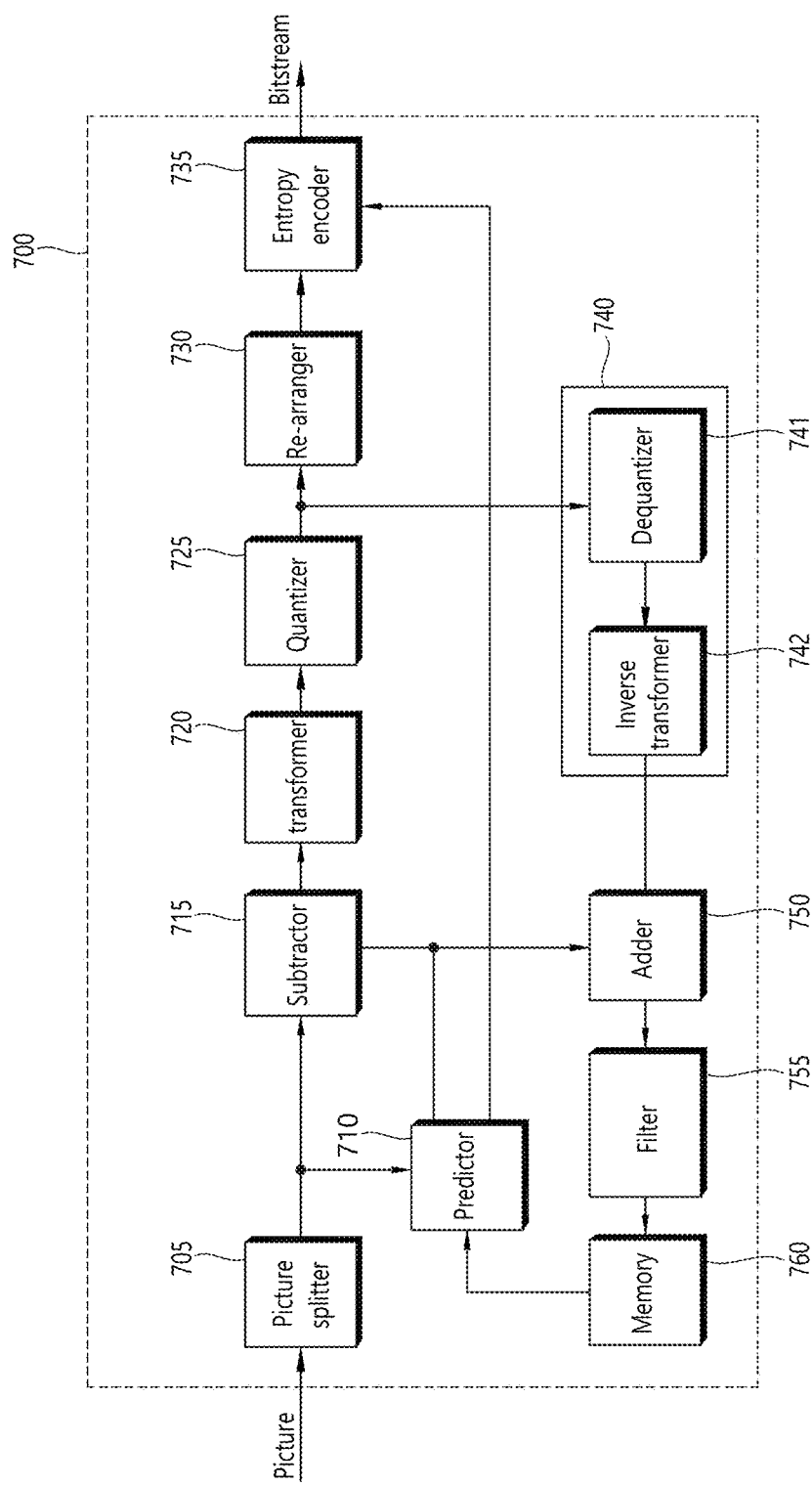
FIG. 7 is a view illustrating a configuration of a data encoder according to the present disclosure.

FIG. 7 is a view illustrating a configuration of a data encoder according to the present disclosure. The data encoder according to the present disclosure can perform various encoding schemes including a video/image encoding scheme according to high efficiency video codec (HEVC).

Referring to FIG. 7, a data encoder 700 may include a picture splitter 705, a predictor 710, a subtractor 715, a transformer 720, a quantizer 725, a re-arranger 730, an entropy encoder 735, a residual processor 740, an adder 750, a filter 755, and a memory 760. The residual processor 740 may include a dequantizer 741 and an inverse transformer 742.

The picture splitter 705 can split an input image into at least one processing unit. A unit represents a basic unit of image processing. The user can include at least one of a specific region of a picture and information related to the region. The unit may be used interchangeably with the term "block" or "area" as necessary. In normal cases, an M×N block can represent samples composed of M columns and N rows or a set of transform coefficients.

For example, a processing unit may be referred to as a coding unit (CU). In this case, a coding unit can be recursively split from a largest coding unit (LCU) according to a quad-tree binary-tree (QTBT) structure. For example, one coding unit can be divided into a plurality of coding units of a deeper depth based on a quad tree structure and/or a binary tree structure. In this case, the quad tree structure may be applied first and then the binary tree structure may be applied, for example. Alternatively, the binary tree structure may be applied first. A coding procedure according to the present disclosure can be performed based on a final coding unit that is not further divided. In this case, a largest coding unit may be used as a final coding unit or a coding unit may be recursively split into coding units of deeper depth as necessary and a coding unit having an optimal size may be used as a final coding unit based on coding efficiency according to video characteristics. Here, the coding procedure can include procedures such as prediction, transformation and reconstruction which will be described later.

Alternatively, a processing unit may include a coding unit (CU), a prediction unit (PU) or a transform unit (TU). The coding unit may be split from a largest coding unit (LCU) into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit based on coding efficiency according to video characteristics. When a smallest coding unit (SCU) is set, a coding unit cannot be split into a coding unit smaller than the smallest coding unit. Here, the final coding unit refers to a coding unit partitioned or split into a prediction unit or a transform unit. A prediction unit is a unit partitioned from a coding unit and may be a unit of sample prediction. Here, the prediction unit may be divided into sub blocks. A transform block can be split from a coding unit according to the quad-tree structure and may be a unit that derives a transform coefficient and/or a unit that derives a residual signal from a transform coefficient. Hereinafter, the coding unit may be called a coding block (CB), the prediction unit may be called a prediction block (PB), and the transform unit may be called a transform block (TB). The prediction block or the prediction unit may mean a specific area having a block shape in a picture, and may include a prediction sample array. Further, the transform block or the transform unit may mean a specific area having a block shape in a picture, and may include a transform coefficient or a residual sample array.

The predictor 710 may perform prediction on a processing target block (hereinafter, a current block), and may generate a prediction block including prediction samples for the current block. A unit of prediction performed in the predictor 710 may be a coding block, or may be a transform block, or may be a prediction block.

The predictor 710 may determine whether intra-prediction is applied or inter-prediction is applied to the current block. For example, the predictor 710 may determine whether the intra-prediction or the inter-prediction is applied in unit of CU.

In case of the intra-prediction, the predictor 710 may derive a prediction sample for the current block based on a reference sample outside the current block in a picture to which the current block belongs (hereinafter, a current picture). Here, the predictor 710 may (i) derive the prediction sample based on an average or interpolation of neighboring reference samples of the current block or (ii) derive the prediction sample based on a reference sample existing in a specific (prediction) direction as to a prediction sample among the neighboring reference samples of the current block. The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 710 may determine the prediction mode to be applied to the current block by using the prediction mode applied to the neighboring block.

In case of the inter-prediction, the predictor 710 may derive the prediction sample for the current block based on a sample identified by a motion vector on a reference picture. The predictor 710 may derive the prediction sample for the current block by applying any one of a skip mode, a merge mode, and a motion vector prediction (MVP) mode. In case of the skip mode and the merge mode, the predictor 710 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor 715 generates a residual sample which is a difference between an original sample and a prediction sample. If the skip mode is applied, the residual sample may not be generated as described above.

The transformer 720 transforms residual samples in units of a transform block to generate a transform coefficient. The transformer 720 may perform transformation based on the size of a corresponding transform block and a prediction mode applied to a coding block or prediction block spatially overlapping with the transform block. For example, residual samples can be transformed using discrete sine transform (DST) if intra-prediction is applied to the coding block or the prediction block overlapping with the transform block and the transform block is a 4×4 residual array and is transformed using discrete cosine transform (DCT) in other cases.

The quantizer 725 may quantize the transform coefficients to generate a quantized transform coefficient.

The re-arranger 730 rearranges quantized transform coefficients. The re-arranger 730 may rearrange the quantized transform coefficients in the form of a block into a one-dimensional vector through a coefficient scanning method. Although the re-arranger 730 is described as a separate component, the re-arranger 730 may be a part of the quantizer 725.

The entropy encoder 735 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 735 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 741 dequantizes values (transform coefficients) quantized by the quantizer 725 and the inverse transformer 742 inversely transforms values dequantized by the dequantizer 741 to generate a residual sample.

The adder 750 adds a residual sample to a prediction sample to reconstruct a picture. The residual sample may be added to the prediction sample in units of a block to generate a reconstructed block. Although the adder 750 is described as a separate component, the adder 750 may be a part of the predictor 710. Further, the adder 750 may be called a reconstruction unit or a reconstructed block generator.

The filter 755 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 755 may apply an adaptive loop filter (ALF) to the reconstructed picture. The ALF may be applied to the reconstructed picture to which deblocking filtering and/or sample adaptive offset has been applied.

The memory 760 may store a reconstructed picture (reconstructed picture) or information necessary for encoding/decoding. Here, the reconstructed picture may be the reconstructed picture filtered by the filter 755. The stored reconstructed picture may be used as a reference picture for (inter) prediction of other pictures. For example, the memory 760 may store (reference) pictures used for inter-prediction. Here, pictures used for inter-prediction may be designated according to a reference picture set or a reference picture list.

Figure 8:
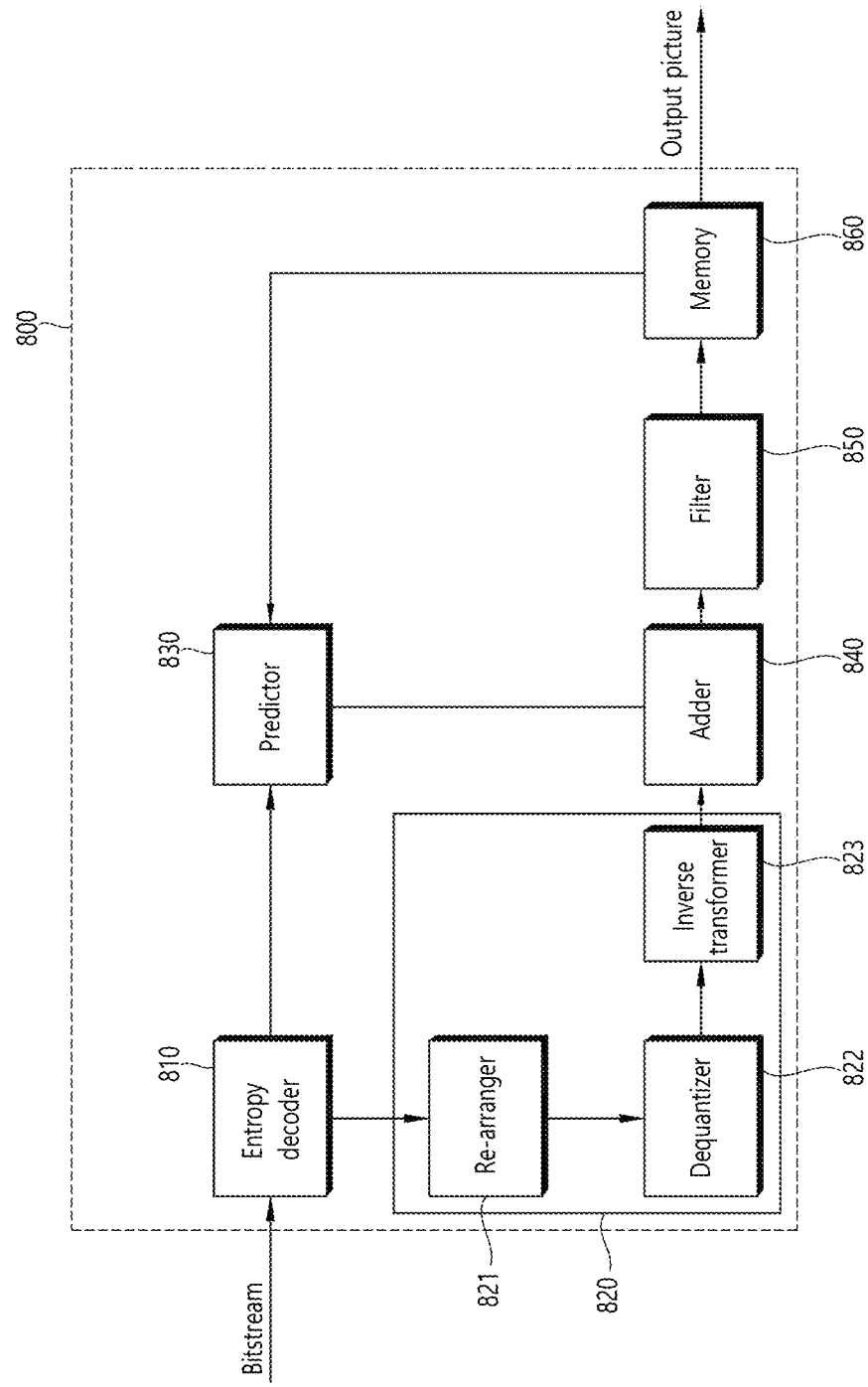
FIG. 8 is a view illustrating a configuration of a data decoder according to the present disclosure.

FIG. 8 is a view illustrating a configuration of a data decoder according to the present disclosure.

Referring to FIG. 8, the data decoder 800 includes an entropy decoder 810, a residual processor 820, a predictor 830, an adder 840, a filter 850, and a memory 860. Here, the residual processor 820 may include a re-arranger 821, a dequantizer 822 and an inverse transformer 823.

When a bitstream including video information is input, the video decoder 900 may reconstruct a video in association with a process by which the video information has been processed in a video encoding device.

For example, the video decoder 800 may perform video decoding by using a processing unit applied in the video encoding device. Therefore, the processing unit block of video decoding may be a coding unit, a prediction unit, or a transform unit. The coding unit block may be split according to a quad tree structure and/or a binary tree structure from a largest coding unit block.

A prediction unit and a transform unit may be further used as necessary. In this case, the prediction unit is a block derived or partitioned from the coding unit and may be a unit of sample prediction. Here, the prediction unit block may be divided into sub blocks. The transform unit may be split from the coding unit according to the quad tree structure, and may be a unit for deriving a transform coefficient or a unit for deriving a residual signal from a transform coefficient.

The entropy decoder 810 may parse the bitstream to output information necessary for video reconstruction or picture reconstruction. For example, the entropy decoder 810 may decode information in the bitstream based on a coding method such as exponential Golomb encoding, CAVLC, CABAC, or the like, and may output a value of a syntax element necessary for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of a symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 810 may be provided to the predictor 830 and residual values, that is, quantized transform coefficients, on which entropy decoding has been performed by the entropy decoder 810 may be input to the re-arranger 821.

The re-arranger 821 may rearrange the quantized transform coefficients into a two-dimensional block form. The re-arranger 821 may perform rearrangement corresponding to coefficient scanning performed by the encoding device. Although the re-arranger 821 is described as a separate component, the re-arranger 821 may be a part of the quantizer 822.

The dequantizer 822 may de-quantize the quantized transform coefficients based on a (de)quantization parameter to output a transform coefficient. In this case, information for deriving a quantization parameter may be signaled from the encoding device.

The inverse transformer 823 may inverse-transform the transform coefficients to derive residual samples.

The predictor 830 may perform prediction on a current block, and may generate a prediction block including prediction samples for the current block. A unit of prediction performed in the predictor 830 may be a coding block or may be a transform block or may be a prediction block.

The predictor 830 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 830 may derive a prediction sample for a current block based on a neighboring reference sample in a current picture. The predictor 830 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 830 may derive a prediction sample for a current block based on a sample specified in a reference picture according to a motion vector. The predictor 830 may derive the prediction sample for the current block using one of the skip mode, the merge mode and the MVP mode. Here, motion information necessary for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 830 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 830 may derive the motion vector of the current block using the merge index.

When the MVP (Motion Vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 830 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 830 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 840 can add a residual sample to a prediction sample to reconstruct a current block or a current picture. The adder 840 may reconstruct the current picture by adding the residual sample to the prediction sample in units of a block. When the skip mode is applied, a residual is not transmitted and thus the prediction sample may become a reconstructed sample. Although the adder 840 is described as a separate component, the adder 840 may be a part of the predictor 830. Further, the adder 840 may be called a reconstruction unit or a reconstructed block generator.

The filter 850 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 860 may store a reconstructed picture (decoded picture) or information necessary for decoding. Here, the reconstructed picture may be the reconstructed picture filtered by the filter 850. For example, the memory 860 may store pictures used for inter-prediction. Here, the pictures used for inter-prediction may be designated according to a reference picture set or a reference picture list. A reconstructed picture may be used as a reference picture for other pictures. The memory 860 may output reconstructed pictures in an output order.

Figure 9:
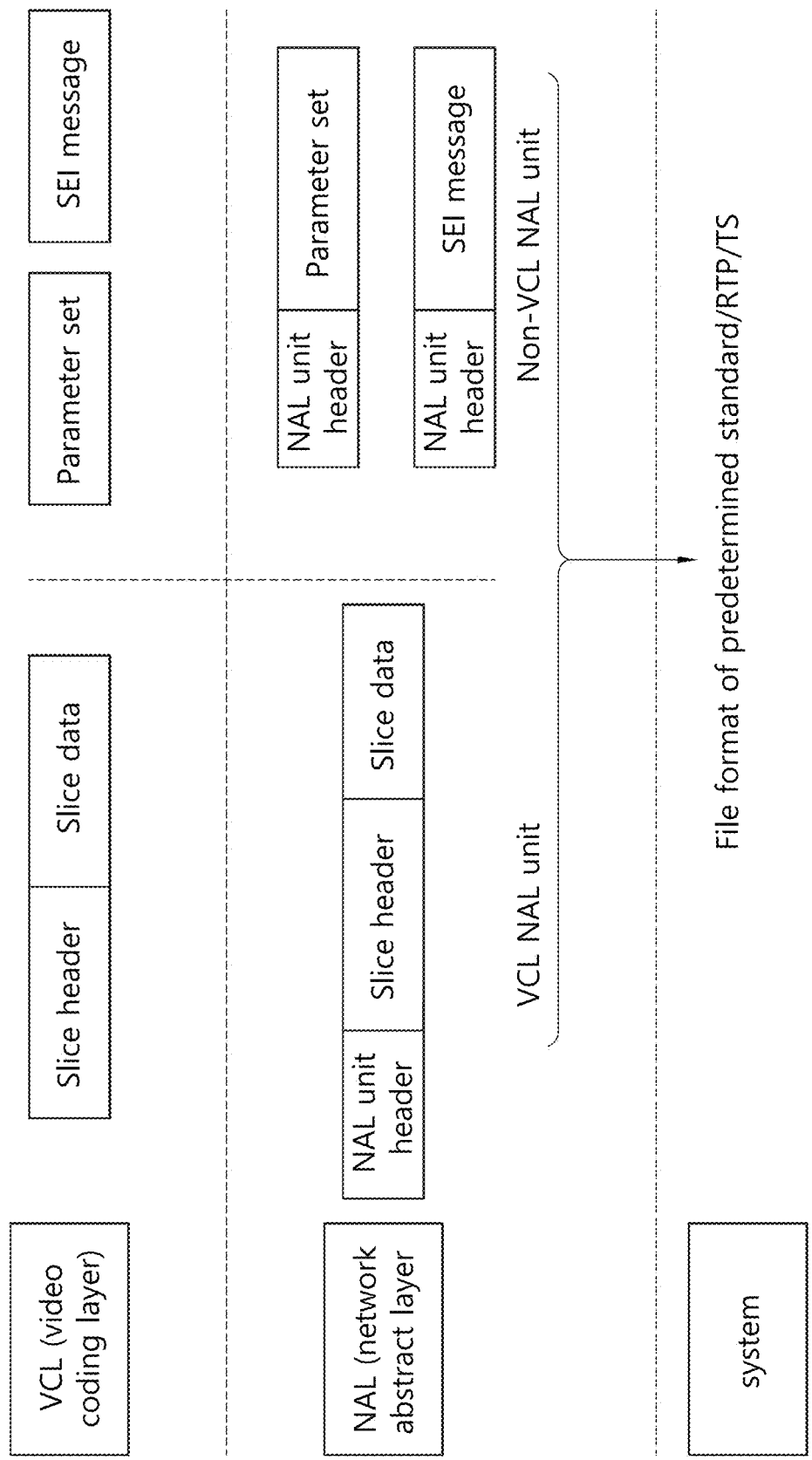
FIG. 9 illustrates a hierarchical structure for coded data.

FIG. 9 illustrates a hierarchical structure for coded data.

Referring to FIG. 9, coded data can be classified into a video coding layer (VCL) that handles vide/image coding processing and the video/image and a network abstraction layer (NAL) preset between the corresponding system and a sub-system which stores and transmits data of a coded video/image.

A NAL unit that is a basic unit of NAL serves to map a coded image to a bit string of a sub-system such as a file format according to a predetermined standard, real-time transport protocol (TTTP) and a transport stream (TS).

With respect to the VCL, a parameter set (a picture parameter set, a sequence parameter set, a video parameter set, or the like) corresponding to a header such as a sequence or a picture and a supplemental enhancement information (SEI) message additionally necessary for a related procedure such as displaying are separated from information (slice data) about a video/image. The VCL including the information about the video/image is composed of slice data and a slice header.

As shown, a NAL unit is composed of a NAL unit header and a raw byte sequence payload (RBSP) generated in a VCL. The NAL unit header includes information about the type of the corresponding NAL unit.

The NAL unit is divided into a VCL NAL unit and a non-VCL NAL unit according to RBSP generated in the VCL. The VCL NAL unit refers to a NAL unit including information about a video/image and the non-VCL NAL unit refers to a NAL unit including information (a parameter set or an SEI message) necessary to code a video/image. The VCL NAL unit may be divided into various types according to properties and types of pictures included in the corresponding NAL unit.

The present disclosure may relate to a 360-degree video transmission method and a 360-degree video reception method. The 360-degree video transmission/reception methods according to the present disclosure can be performed by means of the above-described 360-degree video transmission/reception devices or embodiments thereof.

Embodiments of the above-described 360-degree video transmission/reception devices and transmission/reception methods and embodiments of internal/external elements of the devices may be combined. For example, embodiments of the projection processor and embodiments of the data encoder can be combined to generate as many embodiments of the 360-degree video transmission devices as the number of cases. Embodiments combined in this manner are also included in the scope of the present disclosure.

According to the present disclosure, region-wise independent processing can be supported for user viewport dependent efficient processing. To this end, a specific region of an image can be extracted and/or processed to configure an independent bitstream and a file format for extraction and/or processing of the specific region can be configured. In this case, it is possible to signal original coordinate information of the extracted region to support efficient image region decoding and rendering at a receiving end. Hereinafter, a region in which independent processing of an input image is supported may be referred to as a sub-picture. The input image can be split into sub-picture sequences before encoding and each sub-picture sequence can cover a subset of a spatial area of 360-degree video content. Each sub-picture sequence can be independently encoded and output as a single-layer bitstream. Each sub-picture bitstream can be encapsulated in a file based on a separate track or may be streamed. In this case, a reception device can decode and render tracks that cover the entire region or may select a track related to a specific sub-picture based on metadata with respect to an orientation and a viewport, decode and render the track.

Figure 10:
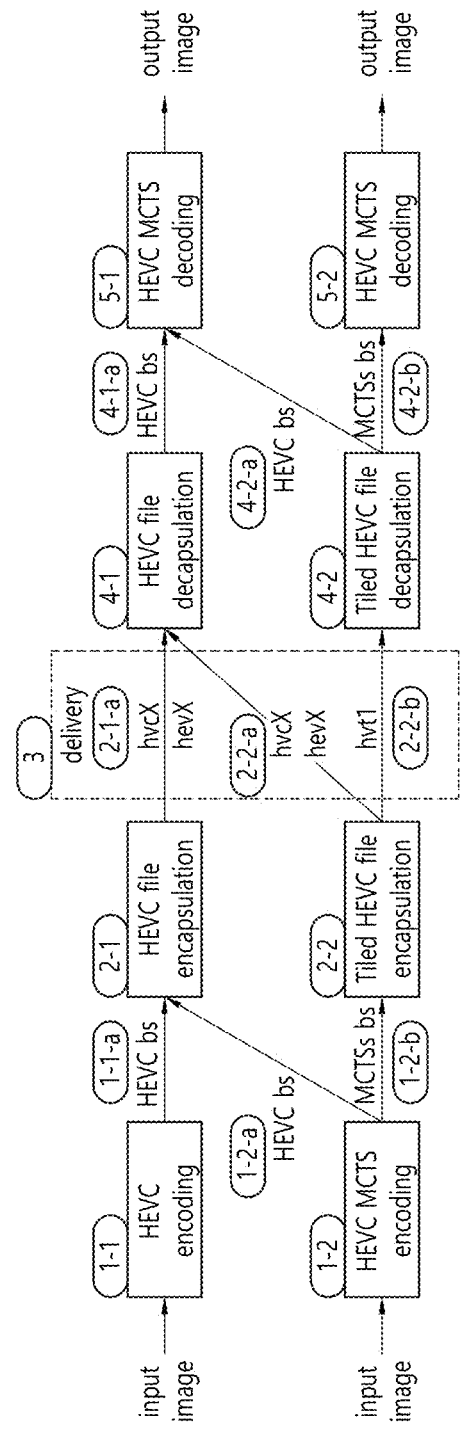
FIG. 10 illustrates a motion constraint tile set (MCTS) extraction and transmission process which is an example of region-wise independent processing.

FIG. 10 illustrates a motion constraint tile set (MCTS) extraction and transmission process that is an example of region-wise independent processing.

Referring to FIG. 10, a transmission device encodes an input image. Here, the input image can correspond to the above-described projected picture or packed picture.

For example, the transmission device can encode the input image according to a normal HEVC encoding procedure (1-1). In this case, the input image can be encoded and output as a single HEVC bitstream HEVC bs (1-1-a).

Alternatively, region-wise independent encoding (HEVC MCTS encoding) may be performed on the input image (1-2). Accordingly, MCTS streams for a plurality of regions can be output (1-2-b). Alternatively, some regions may be extracted from MCTS streams and output as a single HEVC bitstream (1-2-a). In this case, whole information for decoding and reconstruction of some regions is included in the bitstream, and thus a receiving end can completely reconstruct the some regions based on one bitstream for the some regions. An MCTS stream may also be referred to as an MCTS bitstream.

The transmission device can encapsulate the encoded HEVC bitstream according to (1-1-a) or (1-2-a) into a single track in a file for storage and transmission (2-1) and transmit the single track to a reception device (2-1-a). In this case, the track can be represented as an identifier such as hvcX or hevX.

Further, the transmission device can encapsulate the encoded MCTS stream according to (1-2-b) into a file for storage and transmission (2-2). For example, the transmission device can encapsulate MCTSs for independent processing into an separate track and transmit the same (2-2-b). Here, information such as a base track for MCTS stream processing or an extractor track for extracting and processing some MCTS regions may also be included in the file. In this case, the separate track may be represented as, for example, an identifier such as hvcX or hevX. Alternatively, the transmission device may encapsulate a file including a track for one MCTS region and transmit the same using the extractor track (2-2-a). That is, the transmission device can extract and transmit only a track corresponding to one MCTS. In this case, the corresponding track can be represented as, for example, an identifier such as hvt1.

The reception device can receive the file according to (2-1-a) or (2-2-a), perform a decapsulation procedure (4-1) and derive the HEVC bitstream (4-1-a). In this case, the reception device can decapsulate one track in the received file to derive one bitstream.

Further, the reception device may receive the file according to (2-2-b), perform a decapsulation procedure (4-2) and derive the MCTS stream or one HEVC bitstream. For example, the reception device can extract the entire MCTS stream when tracks of MCTSs corresponding to all regions and a base track are included in the file (4-2-b). Alternatively, when an extractor track is included in the track, the reception device can extract the corresponding MCTS track and decapsulte the MCTS track to generate one (HEVC) bitstream (4-2-a).

The reception device can decode one bitstream according to (4-1-a) or (4-2-a) to generate an output image (5-1). Here, when one bitstream according to (4-2-a) is decoded, an output image with respect to some MCTS regions may be generated. Alternatively, the reception device can decode the MCTS stream according to (4-2-b) to generate an output image (5-2).

Figure 11:
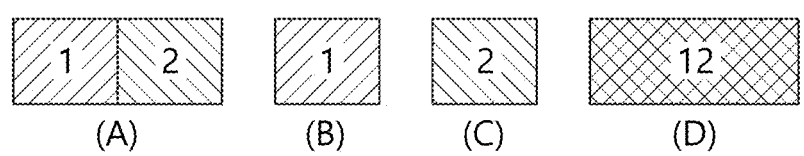
FIG. 11 illustrates an example of image frames for supporting region-wise independent processing.

FIG. 11 illustrates an example of an image frame for supporting region-wise independent processing. As described above, a region supporting independent processing may be referred to as a sub-picture.

Referring to FIG. 11, one input image can be composed of two left and right MCTS regions. The shape of an image frame encoded/decoding through the above-described procedures 1-2 to 5-2 may be the same as (A) to (D) of FIG. 11 or correspond to some thereof.

In FIG. 11, (A) has both regions 1 and 2 and represents an image frame on which separate region independent/parallel processing can be performed. (B) has only region 1 and represents an independent image frame having a half horizontal resolution. (C) has only region 2 and represents an independent image frame having a half horizontal resolution. (D) has both regions 1 and 2 and represents an image frame which can be processed without separate region independent/parallel processing support.

Bitstream compositions of 1-2-b and 4-2-b for the aforementioned image frame derivation may be the same as the composition below or correspond to some thereof.

Figure 12:
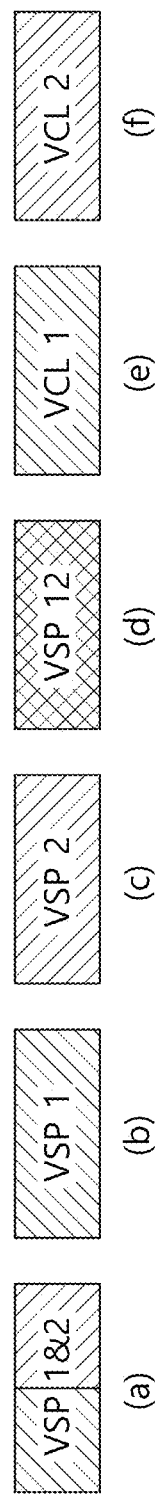
FIG. 12 illustrates an example of a bitstream composition for supporting region-wise independent processing.

FIG. 12 illustrates an example of a bitstream composition for supporting region-wise independent processing.

Referring to FIG. 12, VSP represents VPS, SPS and PPS, VSP1 represents VSP with respect to region #1, VSP2 represents VSP with respect to region #2, and VSP12 represents VSP with respect to both regions #1 and #2. In addition, VCL1 represents VCL with respect to region #1 and VCL2 represents VCL with respect to region #2.

In FIG. 12, (a) represents non-VCL NAL units (e.g., VPS NAL unit, SPS NAL unit, PPS NAL unit, etc.) for image frames on which independent/parallel processing of all regions can be performed. (b) represents non-VCL NAL units (e.g., VPS NAL unit, SPS NAL unit, PPS NAL unit, etc.) which have only region 1 and are for image frames having a half resolution. (c) represents non-VCL NAL units (e.g., VPS NAL unit, SPS NAL unit, PPS NAL unit, etc.) which have only region 2 and are for image frames having a half resolution. (d) represents non-VCL NAL units (e.g., VPS NAL unit, SPS NAL unit, PPS NAL unit, etc.) which have both regions 1 and 2 and are for image frames which can be processed without separate region independent/parallel processing supports. (e) represents VCL NAL units of region 1. (f) represents VCL NAL units of region 2.

For example, a bitstream including NAL units of (a), (e) and (f) can be generated to generate image frame (A). A bitstream including NAL units of (b) and (e) can be generated to generate image frame (B). A bitstream including NAL units of (c) and (f) can be generated to generate image frame (C). A bitstream including NAL units of (d), (e) and (f) can be generated to generate image frame (D). In this case, information (e.g., mcts_sub_bitstream_region_in_original_picture_coordinate_info( ) and the like) indicating a position of a specific region on a picture can be included in a bitstream for an image frame such as (B), (C) or (D) and transmitted. In this case, positional information in the original frame of a selected region can be identified through the aforementioned information.

In a case in which a selected region is not located at the end of left top that is a basis for the original image frame like a case in which only region 2 is selected (a bitstream includes NAL unis of (c) and (f)), a process such as correcting a slice segment address of a slice segment header in a bitstream extraction procedure may be performed.

Figure 13:
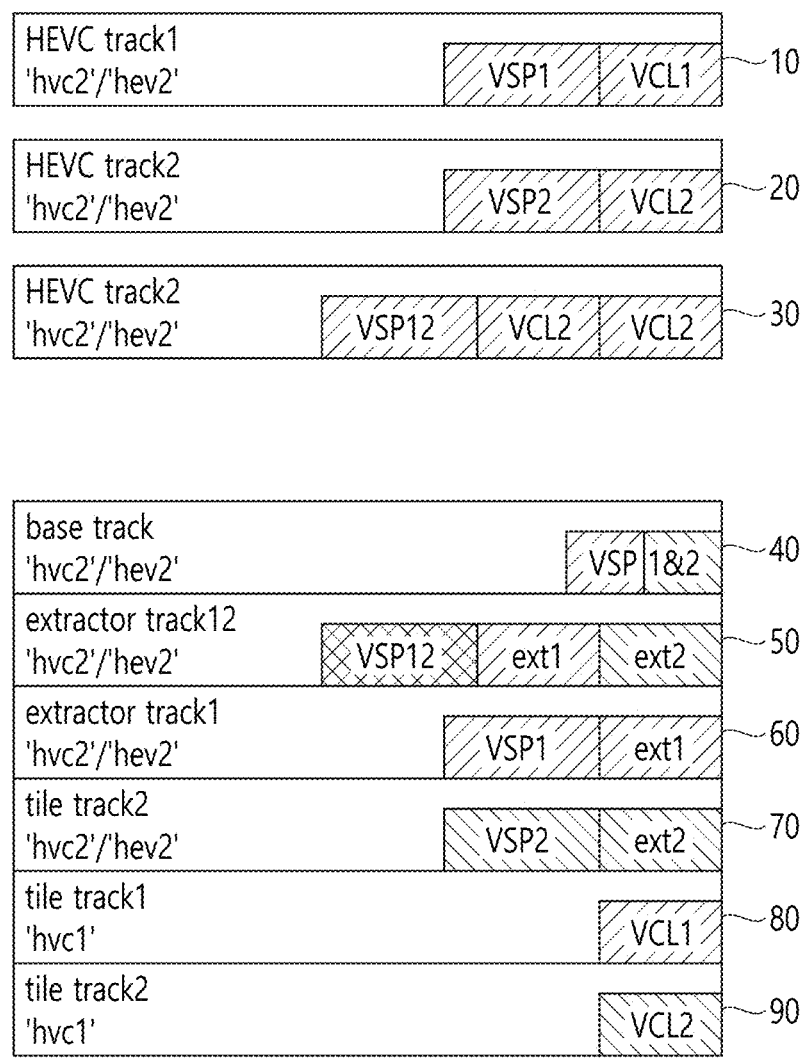
FIG. 13 illustrates a track composition of a file according to the present disclosure.

FIG. 13 illustrates a track composition of a file according to the present disclosure. When a specific region is selectively encapsulated or coded as in 2-2-a or 4-2-a described in FIG. 10, a related file composition may be the same as the following cases or include some thereof.

Referring to FIG. 13, when a specific region is selectively encapsulated or coded as in 2-2-a or 4-2-a described in FIG. 10, a related file composition may be the same as the following cases or include some thereof.

(1) Case in which one track 10 includes NAL units of (b) and (e), (2) Case in which one track 20 includes NAL units of (c) and (f)

(3) Case in which one track 30 includes NAL units of (d), (e) and (f)

Further, the aforementioned related file composition may include the following tracks or a combination of some tracks.

(4) Base track 40 including (a)

(5) Extractor track 50 including (d) and having extractors (e.g., ext1 and ext2) for accessing (e) and (f)

(6) Extractor track 60 including (b) and having an extractor for accessing (e)

(7) Extractor track 70 including (c) and having an extractor for accessing (f)

(8) Tile track 80 including (e)

(9) Tile track 90 including (f)

In this case, information indicating a position of a specific region on a picture may be included in the aforementioned tracks 10, 20, 30, 50, 60 and 70 in the form of a box such as RegionOriginalCoordninateBox which will be described later such that positional information of the selected region in the original frame can be identified. Here, the region may also be called a sub-picture as described above. The service provider can configure all of the aforementioned tracks, and for transmission, select, combine and transmit some of the tracks.

Figure 15:
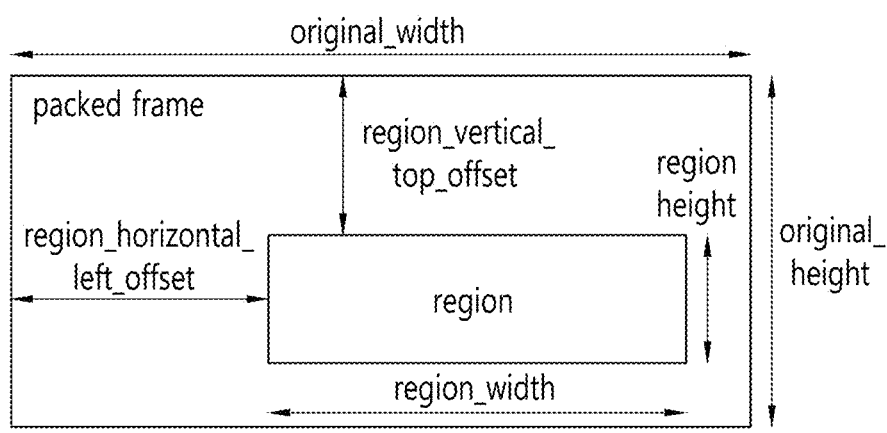
FIG. 15 illustrates a region indicated by corresponding information in an original picture.

FIG. 14 illustrates RegionOriginalCoordninateBox according to an example of the present disclosure. FIG. 15 illustrates a region indicated by corresponding information in an original picture.

Referring to FIG. 14, RegionOriginalCoordninateBox is information indicating the size and/or the position of a region (sub-picture or MCTS) on which region-wise independent processing according to the present disclosure can be performed. Specifically, when one visual content is divided into one or more regions and stored/transmitted, RegionOriginalCoordninateBox can be used to identify positions of the regions on a coordinate of the entire visual content. For example, a packed frame (packed picture) or a projected frame (projected picture) for 360-degree video can be stored/transmitted as separate regions in the form of independent video streams for user viewport dependent efficient processing, and one track can correspond to a rectangular region composed of one or more tiles. Separate regions may correspond to HEVC bitstreams extracted from an HEVC MCTS bitstream. RegionOriginalCoordninateBox can be present under a visual sample entry of a track in which a separate region is stored/transmitted to describe coordinate information of the region. RegionOriginalCoordninateBox may be hierarchically present under another box such as a scheme information box other than the visual sample entry.

The syntax of RegionOriginalCoordninateBox can include an original_picture_width field, an original_picture_height field, a region_horizontal_left_offset field, a region_vertical_top_offset field, a region_width field, and a region_height field. Some of the fields may be omitted. For example, when the size of an original picture is predefined or acquired in advance through information of other boxes, the original_picture_width field and the original_picture_height field can be omitted.

The original_picture_width field indicates the horizontal resolution (width) of the original picture (i.e., a packed frame or a projected frame) to which a corresponding region (sub-picture or tile) belongs. The original_picture_height field indicates the vertical resolution (height) of the original picture (i.e., a packed frame or a projected frame) to which the corresponding region (sub-picture or tile) belongs. The region_horizontal_left_offset field indicates the horizontal coordinate of the left end of the corresponding region based on the coordinates of the original picture. For example, the field can indicate the horizontal coordinate value of the left end of the corresponding region based on the coordinates of left top of the original picture. The region_vertical_top_offset field indicates the vertical coordinate of the left end of the corresponding region based on the coordinates of the original picture. For example, the field can indicate the vertical coordinate value of the top end of the corresponding region based on the coordinates of left top of the original picture. The region_width field indicates the horizontal resolution (width) of the corresponding region. The region_height field indicates the vertical resolution (height) of the corresponding region. The corresponding region can be derived from the original picture based on the aforementioned fields as shown in FIG. 15.

Further, according to an embodiment of the present disclosure, RegionToTrackBox may be used.

FIG. 16 illustrates RegionToTrackBox according to an embodiment of the present disclosure.

RegionToTrackBox can enable identification of a track associated with a corresponding region. The box (information in the form of a box) may be transmitted per track or transmitted only in a representative track. RegionToTrackBox can be stored under 'schi' box along with 360-degree video information such as projection and packing information. In this case, the horizontal resolution and the vertical resolution of an original picture may be identified by width and height values (of the original picture) present in a track header box or a visual sample entry. Further, with respect to a track carrying the aforementioned box and a track in which an separate region is stored/transmitted, a reference relation can be identified by a new reference type such as 'ovrf' (omnidirectional video reference) in a track reference box.

The aforementioned box may be hierarchically present under other boxes such as the visual sample entry other than the scheme Information box.

The syntax of RegionToTrackBox can include a num_regions field and include a region_horizontal_left_offset field, a region_vertical_top_offset field, a region_width field, a region_width field and a track_ID field for each region. Some of these fields may be omitted as necessary.

The num_region field indicates the number of regions in the original picture. The region_horizontal_left_offset field indicates the horizontal coordinate of the left end of a corresponding region based on the coordinates of the original picture. For example, the field can indicate the horizontal coordinate value of the left end of the corresponding region based on the coordinates of the left top of the original picture. The region_vertical_top_offset field indicates the vertical coordinate of the left end of the corresponding region based on the coordinates of the original picture. For example, the field can indicate the vertical coordinate value of the top end of the corresponding region based on the coordinates of the left top of the original picture. The region_width field indicates the horizontal resolution (width) of the corresponding region. The region_height field indicates the vertical resolution (height) of the corresponding region. The Track_ID field indicates an ID of a track in which data corresponding to the corresponding region is stored/transmitted.

Further, according to an embodiment of the present disclosure, an SEI message may include the following information.

FIG. 17 illustrates an SEI message according to an embodiment of the present disclosure.

Referring to FIG. 17, a num_sub_bs_region_coordinate_info_minus1[i] field indicates "the number of mcts_sub_bitstream_region_in_original_picture_coordinate_info corresponding to extracted information"−1. A sub_bs_region_coordinate_info_data_length[i][j] field indicates the number of bytes of included separate mcts_sub_bitstream_region_in_original_picture_coordinate_info. The num_sub_bs_region_coordinate_info_minus1[i] field and the sub_bs_region_coordinate_info_data_length[i][j] field can be coded based on ue(v) indicating unsigned integer 0-th Exp-Golomb coding. Here, (v) can indicate that bits used to code corresponding information are variable. A sub_bs_region_coordinate_info_data_bytes[i][j][k] field indicates bytes of included separate mcts_sub_bitstream_region_in_original_picture_coordinate_info. The sub_bs_region_coordinate_info_data_bytes[i][j][k] field can be coded based on u(8) indicating unsigned integer 0-th coding using 8 bits.

FIG. 18 illustrates mcts_sub_bitstream_region_in_original_picture_coordinate_info according to an embodiment of the present disclosure. mcts_sub_bitstream_region_in_original_picture_coordinate_info can be hierarchically included in the SEI message.

Referring to FIG. 18, an original_picture_width_in_luma_sample field indicates a horizontal resolution of an original picture (i.e., packed frame or projected frame) before extraction of an extracted MCTS sub-bitstream region. An original_picture_height_in_luma_sample field indicates a vertical resolution of the original picture (i.e., packed frame or projected frame) before extraction of the extracted MCTS sub-bitstream region. A sub_bitstream_region_horizontal_left_offset_in_luma_sample field indicates the horizontal coordinate of the left end of the corresponding region based on the coordinates of the original picture. A sub_bitstream_region_vertical_top_offset_in_luma_sample field indicates the vertical coordinate of the top end of the corresponding region based on the coordinates of the original picture. A sub_bitstream_region_width_in_luma_sample field indicates a horizontal resolution of the corresponding region. A sub_bitstream_region_height_in_luma_sample field indicates a vertical resolution of the corresponding region.

Further, when all MCTS bitstreams are present in one file, the following information can be used for data extraction for a specific MCTS region.

FIG. 19 illustrates information related to an MCTS region in a file including a plurality of MCTS bitstreams according to an embodiment of the present disclosure.

Referring to FIG. 19, MCTS bitstreams can be defined as one group through sampling grouping and the aforementioned VPS, SPS and PPS associated with a corresponding MCTS can be included in a nalUnit field of FIG. 19. A NAL_unit_type field can indicate one of the VPS, SPS and PPS as the type of a corresponding NAL unit and the NAL unit(s) of the indicated type can be included in the nalUnit field.

The aforementioned region in which independent processing is supported, MCTS region and the like can be used in the same meaning although there is a difference between representations thereof, and may be referred to as a sub-picture as described above. Omnidirectional 360-degree video can be stored and transmitted through a file composed of sub-picture tracks and can be used for user viewport or viewport dependent processing. The sub-pictures can be a sub-set of spatial areas of an original picture and each sub-picture can be stored in a separate track.

Viewport dependent processing can be performed based on the following flow.

Figure 20:
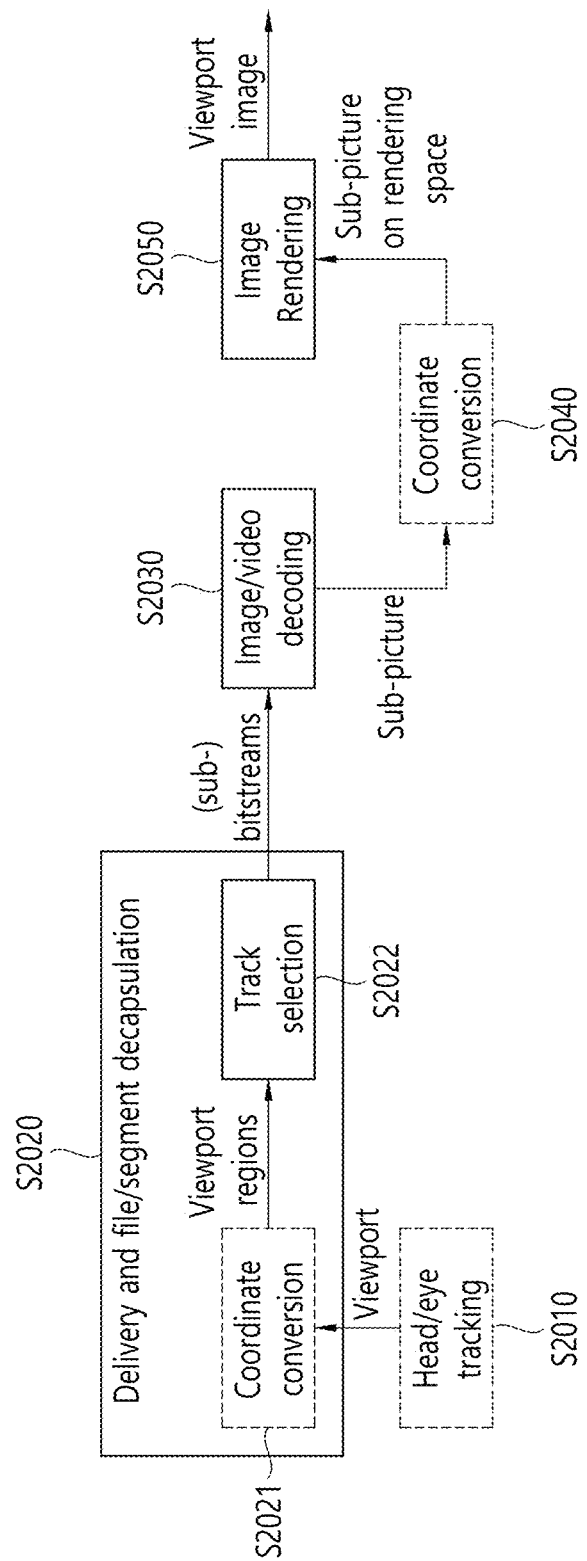
FIG. 20 illustrates viewport dependent processing according to an embodiment of the present disclosure.

FIG. 20 illustrates viewport dependent processing according to an embodiment of the present disclosure.

Referring to FIG. 20, a reception device performs head and/or eye tracking (S2010). The reception device derives viewport information through head and/or eye tracking.

The reception device performs file/segment decapsulation on a received filed (S2020). In this case, the reception device can detect regions (viewport regions) corresponding to a current viewport through coordinate conversion (S2021) and select and extract tracks containing sub-pictures that cover the viewport regions (S2022).

The reception device decodes (sub)bitstream(s) with respect to the selected track(s) (S2030). The reception device can decode/reconstruct the sub-pictures through the decoding. In this case, the reception device can decode only the aforementioned sub-pictures instead of the entire original picture, distinguished from a conventional decoding procedure of performing decoding on the original picture.

The reception device maps the decoded sub-picture(s) decoded through coordinate conversion to a rendering space (2040). Since decoding is performed on the sub-picture(s) instead of the entire picture, the sub-pictures can be mapped to a rendering space based on information representing positions of the sub-pictures in the original picture, and viewport dependent processing can be performed. The reception device can generate an image (viewport image) associated with the corresponding viewport and display the image to a user (S2050).

The coordinate conversion procedure for sub-pictures may be necessary for the rending procedure as described above. This not necessary for conventional 360-degree video processing procedures. According to the present disclosure, sub-pictures can be mapped to a rendering space based on information representing positions of the sub-pictures in the original picture because decoding is performed on sub-picture(s) instead of the entire picture, and viewport dependent processing can be performed.

That is, after decoding per sub-picture, decoded pictures may need to be arranged for appropriate rendering. Packed frames can be rearranged as projected frames (if applied to a region-wise packing process) and the projected frames can be arranged according to a projection structure for rending. Accordingly, when 2D coordinates on the packed frames/projected frames are indicated in signaling of coverage information of tracks carrying sub-pictures, decoded sub-pictures can be arranged into the packed frames/projected frames. Here, the coverage information can include information representing positions (positions and sizes) of regions according to the present disclosure.

According to the present disclosure, one sub-picture may also be spatially separated on a packed frame/projected frame. In this case, regions separated from each other in a 2D space within one sub-picture may be referred to as sub-picture regions. For example, when equirectangular projection (ERP) format is used as a projection format, the left end and the right end of a packed frame/projected frame may be attached to each other on a spherical surface on which the frame is actually rendered. To cover this, sub-picture regions spatially separated from each other on the packed frame/projected frame can be configured as one sub-picture, and related coverage information and sub-picture composition may be as follows, for example.

Figure 22:
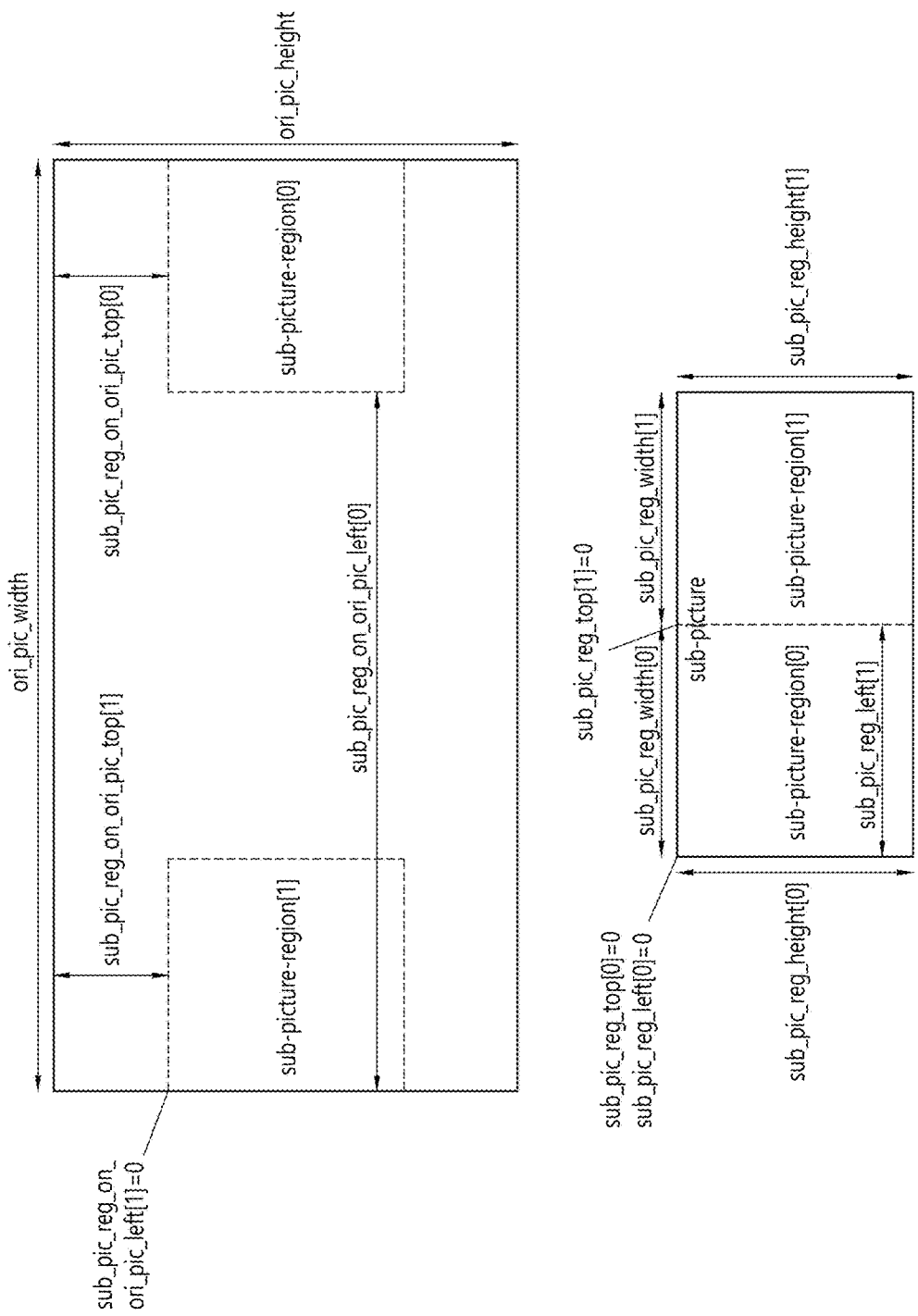
FIG. 22 illustrates a sub-picture composition according to an embodiment of the present disclosure.

FIG. 21 illustrates coverage information according to an embodiment of the present disclosure and FIG. 22 illustrates a sub-picture composition according to an embodiment of the present disclosure. The sub-picture composition in FIG. 22 can be derived based on the coverage information illustrated in FIG. 21.

Referring to FIG. 21, an ori_pic_width field and an ori_pic_height field respectively indicate the width and height of the entire original picture constituting sub-pictures. The width and height of a sub-picture can be represented as a width and a height in a visual sample entry. A sub_pic_reg_flag field indicates presence or absence of a sub-picture region. When the sub_pic_reg_flag field is 0, this indicates that a sub-picture is arranged on the original picture intact. When the sub_pic_reg_flag field is 1, this can indicates that the sub-picture is segmented into sub-picture regions and the sub-picture regions are arranged on a frame (original picture). As illustrated in FIG. 21, sub-picture regions can be arranged across a frame boundary. A sub_pic_on_ori_pic_top field and a sub_pic_on_ori_pic_left field respectively indicate the top sample row and the left-most sample column of a sub-picture in the original picture. Values of the sub_pic_on_ori_pic_top field and the sub_pic_on_ori_pic_left field may be in the range of 0 indicating the top-left corner of the original picture (inclusive) to values of the ori_pic_height field and ori_pic_width field (exclusive). A num_sub_pic_regions field indicates the number of sub-picture regions constituting a sub-picture. A sub_pic_reg_top[i] field and a sub_pic_reg_left[i] field respectively indicate the top sample row and the left-most sample column of a corresponding (i-th) sub-picture region on each sub-picture. A correlation (positional order and disposition) between a plurality of sub-picture regions in one sub-picture can be derived through these fields. Values of the sub_pic_reg_top[i] field and sub_pic_reg_left[i] field may be in the range of 0 indicating the top-left corner of each sub-picture (inclusive) to the width and height of the sub-picture (exclusive). Here, the width and height of the sub-picture can be derived from a visual sample entry. A sub_pic_reg_width[i] field and a sub_pic_reg_height[i] field respectively indicate the width and height of the corresponding (i-th) sub-picture region. The sum of values of the sub_pic_reg_width[i] field (i is in the range of 0 to "num_sub_pic_regions field value"−1 can be the same as the width of the sub-picture. Alternatively, the sum of values of the sub_pic_reg_height[i] field (i is in the range of 0 to "num_sub_pic_regions field value"−1 can be the same as the height of the sub-picture. A sub_pic_reg_on_ori_pic_top[i] field and a sub_pic_reg_on_ori_pic_left[i] field respectively indicate the top sample row and the left-most sample column of a corresponding sub-picture region in the original picture. Values of the sub_pic_reg_on_ori_pic_top[i] field and the sub_pic_reg_on_ori_pic_left[i] field may be in the range of 0 indicating the top-left corner of a projected frame (inclusive) to values of the ori_pic_height field and ori_pic_width field (exclusive).

A case in which one sub-picture includes a plurality of sub-picture regions has been described in the aforementioned example, and sub-pictures may be configured in an overlap manner according to the present disclosure. When it is assumed that sub-picture bitstreams are simultaneously exclusively decoded through one video decoder, overlapped sub-pictures can be used to limit the number of video decodes.

Figure 23:
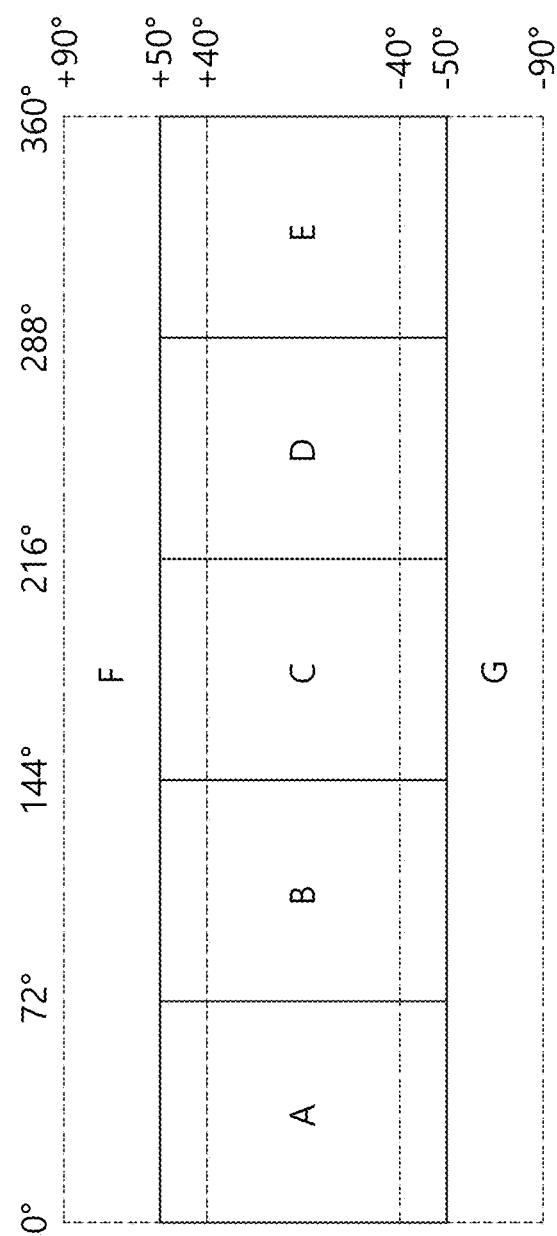
FIG. 23 illustrates overlapped sub-pictures according to an embodiment of the present disclosure.

FIG. 23 illustrates overlapped sub-pictures according to an embodiment of the present disclosure. FIG. 23 shows a case in which source content (e.g., an original picture) is segmented into 7 rectangular regions and the regions are grouped into 7 sub-pictures.

Referring to FIG. 23, sub-picture 1 is composed of regions (sub-picture regions) A and B, sub-picture 2 is composed of regions B and C, sub-picture 3 is composed of regions C and D, sub-picture 4 is composed of regions D and E, sub-picture 5 is composed of regions E and A, sub-picture 6 is composed of region F, and sub-picture 7 is composed of region G.

According to the above-described composition, it is possible to reduce the number of decoders necessary to decode sub-picture bitstreams for the current viewport, and particularly, to efficiently extract and decode sub-pictures when a viewport is located on a side of a picture in the ERP format.

To support the aforementioned sub-picture composition including multiple rectangular regions in a track, for example, the following conditions may be taken into account. One SubpictureCompositionBox may describe one rectangular region. TrackGroupBox may have multiple SubpictureCompositionBoxes. The order of multiple SubpictureCompositionBoxes can indicate positions of rectangular regions in a sub-picture. Here, the order may be a raster scan order.

TrackGroupTypeBox having a track_group_type of 'spco' can indicate that the corresponding track belongs to a composition of tracks that can be spatially arranged to acquire pictures suitable for presentation. Visual tracks (i.e., visual tracks having the same track_group_id value in TrackGroupTypeBox having the track_group_type of 'spco') mapped to corresponding grouping can collectively indicate visual content that can be presented. Respective separate visual tracks mapped to corresponding grouping may be sufficient for presentation or not. When a track carries a sub-picture sequence mapped to multiple rectangular regions on a composed picture, multiple TrackGroupTypeBoxes having the same track_group_id value and a track_group_type of 'spco' may be present. These boxes can be represented according to a raster scan order of rectangular regions on a sub-picture in the TrackGroupBox. In this case, CompositionRestrictionBox can be used to indicate that a visual track alone is not sufficient for presentation. A picture suitable for presentation can be composed by spatially arranging time-parallel samples of all tracks of the same sub-picture composition track group as indicated by syntax elements of track groups.

FIG. 24 illustrates the syntax of SubpictureCompositionBox.

Referring to FIG. 24, a region_x field indicates the horizontal position of the top-left corner of a rectangular region of samples of the corresponding track on a composed picture in luma sample units. The range of values of the region_x field may be 0 to "composition_width field value"−1. A region_y field indicates the vertical position of the top-left corner of the rectangular region of the samples of the corresponding track on the composed picture in luma sample units. The range of values of the region_y field may be 0 to "composition_height field value"−1. A region_width field indicates the width of the rectangular region of the samples of the corresponding track on the composed picture in luma sample units. The range of region_width field values may be 1 to "composition_width field value"−"region_x field value". A region_height field indicates the height of the rectangular region of the samples of the corresponding track on the composed picture in luma sample units. The range of region_height field values may be 1 to "composition_height field value"−"region_x field value". A composition_width field indicates the width of the composed picture in luma sample units. The value of the composition_width field may be equal to or greater than "region_x field value"+"region_width field value". A composition_height field indicates the height of the composed picture in luma sample units. The value of the composition_height field may be equal to or greater than "region_y field value"+"region_height field value". The composed picture can correspond to the aforementioned original picture, packed picture or projected picture.

Further, the following methods may be used to identify a sub-picture track including multiple rectangular regions mapped into the composed picture.

For example, information for identifying the rectangular regions may be signaled through information about a guard band.

When 360-degree video data consecutive in a 3D space is mapped to regions of a 2D image, the 360-degree video data can be coded per region of the 2D image and transmitted to a receiving side, and when the 360-degree video data mapped to the 2D image is rendered into the 3D space, a problem that a boundary between regions in the 3D space appears due to a coding processing difference between regions may be generated. The problem that a boundary between regions in the 3D space appears may be referred to as a boundary error. The boundary error may deteriorate immersiveness of a user for virtual reality. To prevent this problem, a guard band can be used. The guard band can indicate a region that is not directly rendered but is used to improve a rendered part of an associated region or avoid or mitigate visual artifacts such as a seam. The guard band can be used when region-wise packing is applied.

In the present embodiment, the aforementioned multiple rectangular regions can be identified using RegionWisePackingBox.

FIG. 25 illustrates a hierarchical structure of RegionWisePackingBox.

Referring to FIG. 25, a guard_band_flag[i] field indicates that an i-th region does not have a guard band when set to 0. The guard_band_flag[i] field indicates that the i-th region has a guard band when set to 1. A packing_type[i] field indicates a region-wise packing type. The packing_type[i] field indicates rectangular region-wise packing when set to 0. Other values can be reserved. A left_gb_width[i] field indicates the width of a left guard band of the i-th region. The left_gb_width[i] field can indicate the width of the guard band in in units of two luma samples. A right_gb_width[i] field indicates the width of a right guard band of the i-th region. The right_gb_width[i] field can indicate the width of the guard band in in units of two luma samples. A top_gb_width[i] field indicates the width of a top guard band of the i-th region. The top_gb_width[i] field can indicate the width of the guard band in in units of two luma samples. A bottom_gb_width[i] field indicates the width of a bottom guard band of the i-th region. The bottom_gb_width[i] field can indicate the width of the guard band in in units of two luma samples. When the value of the guard_band_flag[i] is 1, the value of the left_gb_width[i] field, the right_gb_width [i] field, the top_gb_width[i] field or the bottom_gb_width[i] field is greater than 0. The i-th region, including its guard bands, if any, shall not overlap with any other region, including its guard bands.

A gb_not_used_for_pred_flag[i] field indicates that guard bands are available for inter-prediction when set to 0. That is, when the value of the gb_not_used_for_pred_flag[i] field is 0, guard bands may be used for inter-prediction or not. The gb_not_used_for_pred_flag[i] indicates that sample values of guard bands are not used for an inter-prediction procedure when se to 1. When the value of the gb_not_used_for_pred_ flag[i] field is 1, samples in guard bands on decoded pictures (decoded packed pictures) can be rewritten or corrected even though the decoded pictures have been used as references for inter-prediction of subsequent pictures to be decoded. For example, content of a region can be seamlessly extended using decoded and reprojected samples of other regions as a guard band thereof.

A gb_type[i] field can indicate types of guard bands of the i-th region as follows. The gb_type[i] field indicates that content of corresponding guard bands is unspecified in relation with content of corresponding region(s) when set to 0. When the value of the gb_not_used_for_pred_flag field is 0, the value of the gb_type field cannot be 0. The gb_type[i] field indicates that content of guard bands is sufficient for interpolation of sub-pixel values in a region (and in one pixel outside a region boundary) when set to 1. The gb_type[i] field having the value of 1 can be used when boundary samples of a region are horizontally or vertically copied to a guard band. The gb_type[i] field indicates that content of guard bands represents actual image content based on gradually changing quality when set to 2, the gradually changing quality representing gradual changing from picture quality of the corresponding region to picture quality of a neighboring region on a spherical surface. The gb_type[i] field indicates that content of guard bands represents actual image content based on picture quality of the corresponding region when set to 3.

When one track includes rectangular regions mapped to a plurality of rectangular regions in a composed picture, some regions may be identified as region-wise packing regions identified by RectRegionPacking(i) and the remaining regions may be identified as guard band regions identified based on some or all of the guard_band_flag[i] field, left_gb_ width[i] field, right_gb_width[i] field, top_gb_height[i] field, bottom_gb_height[o] field, gb_no-t_used_for_pred_ flag[i] field and gb_type[i] field.

For example, in FIG. 22 and description thereof, region E can be identified as a region-wise packing region and region A can be identified as a guard band region located on the right of region E in the case of sub-picture 7. In this case, the width of the guard band region can be identified based on the right_gb_width[i] field. On the other hand, region A can be identified as a region-wise packing region and region E can be identified as a guard band region located on the left, and in this case, the width of the guard band region can be identified based on the left_gb_width[i] field. The type of the guard band region can be indicated through the gb_type[i] field and the aforementioned rectangular regions can be identified as regions having the same quality as that of the same neighboring region through the aforementioned value "3". Further, when the quality of a region-wise packing region differs from that of a guard band region, the rectangular regions may be identified through the aforementioned value "2".

Further, the rectangular regions may be identified through values "4" to "7" of the gb_type[i] field. The gb_type[i] field can indicate that content of a rectangular region is actual image content present in proximity to the corresponding region on a spherical surface and quality thereof gradually changes from an associated region-wise packing region when set to 4. The gb_type[i] field can indicate that content of a rectangular region is actual image content present in proximity to the corresponding region on a spherical surface and quality thereof is the same as that of an associated region-wise packing region when set to 5. The gb_type[i] field can indicate that content of a rectangular region is actual image content present in proximity to the corresponding region on a projected picture and quality thereof gradually changes from an associated region-wise packing region when set to 6. The gb_type[i] field can indicate that content of a rectangular region is actual image content present in proximity to the corresponding region on a projected picture and quality thereof is the same as that of an associated region-wise packing region when set to 7.

Alternatively, information for identifying the aforementioned rectangular regions can be signaled using SubPictureCompositionBox.

In the present disclosure, the aforementioned multiple rectangular regions can be divided into a region present within a composed picture region and a region present outside the composed picture region based on coordinate values. The multiple rectangular regions can be represented by clipping a region present outside the composed picture region and locating the clipped region at an opposite corner.

For example, when the horizontal coordinate x of a rectangular region in a composed picture region is equal to or greater than the value of the composition_width field, a value obtained by subtracting the value of the composition_ width field from x can be used. When the vertical coordinate y of the rectangular region is equal to or greater than the value of the composition_height field, a value obtained by subtracting the value of the composition_height field from y can be used.

To this end, the ranges of the track_width field, track_ height field, composition_width field and composition_ height field of SubPictureCompositionBox described in FIG. 23 can be corrected as follows.

The range of values of the region_width field may be 1 to the value of the composition_width field. The range of values of the region_height field may be 1 to the value of the composition_height field. The value of the composition_ width field may be equal to or greater than "region_x field value"+1. The value of the composition_height field may be equal to or greater than "region_y field value"+1.

Figure 26:
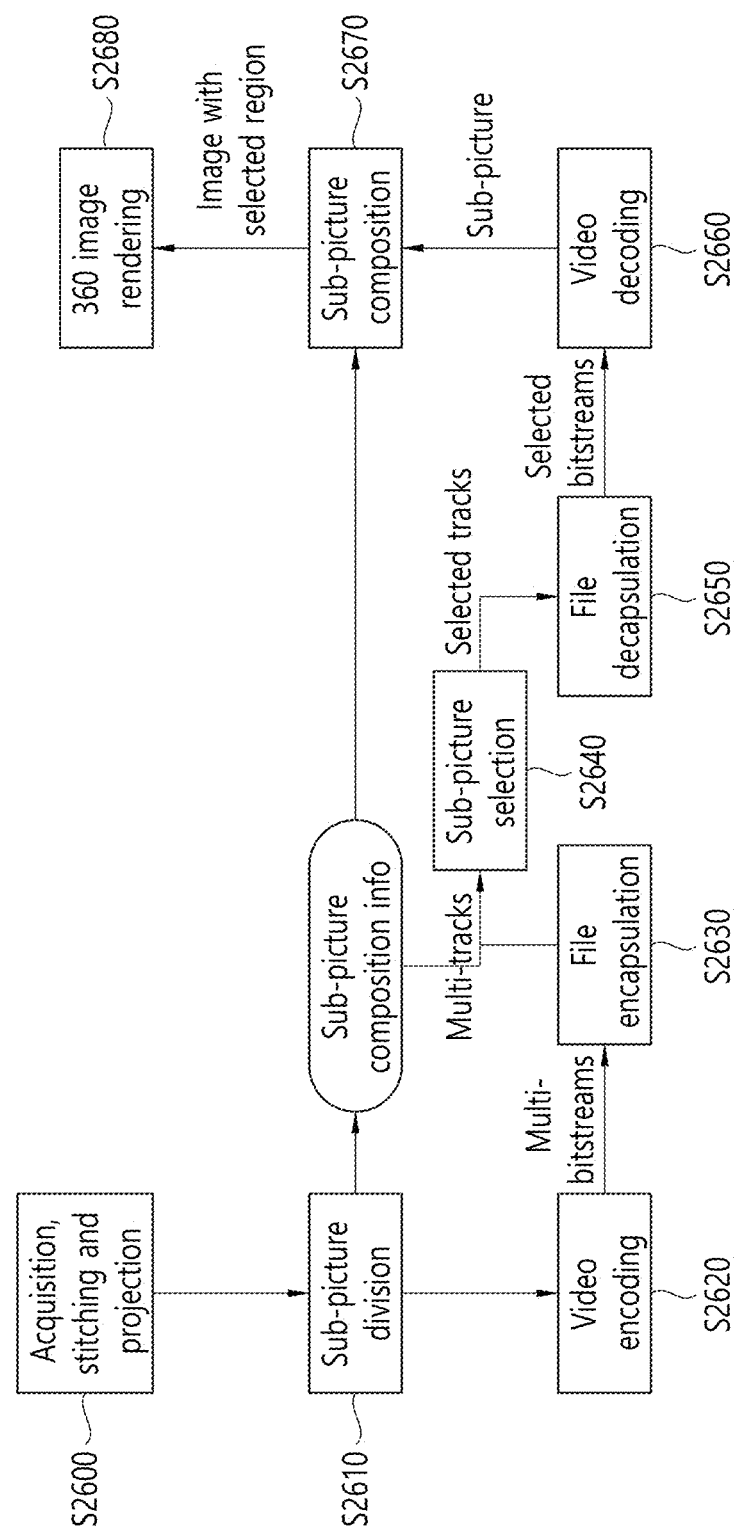
FIG. 26 schematically illustrates a process of transmitting and receiving 360-degree video using a sub-picture composition according to the present disclosure.

FIG. 26 schematically illustrates 360-degree video transmission/reception processes using sub-picture composition according to present disclosure.

Referring to FIG. 26, a transmission device acquires a 360-degree image and maps the acquired image to a 2D picture through stitching and projection (S2600). In this case, region-wise packing can be optionally included. Here, the 360-degree image may be an image captured using at least one 360-degree camera or an image generated or synthesized through an image processing device such as a computer. Here, the 2D picture may include the aforementioned original picture, projected picture/packed picture and composed picture.

The transmission device divides the 2D picture into a plurality of sub-pictures (S2610). In this case, the transmission device can generate and/or use sub-picture composition information.

The transmission device can encode at least one of the plurality of sub-pictures (S2520). The transmission device may select and encode some of the plurality of sub-pictures or encode all of the plurality of sub-pictures. The plurality of sub-pictures can be independently coded.

The transmission device composes a file using encoded sub-picture streams (S2630). The sub-picture streams can be stored in the form of separate tracks. The sub-picture composition information can be included in corresponding sub-picture tracks through at least one of the above-described methods according to the present disclosure.

The transmission device or a reception device can select a sub-picture (S2640). The transmission device can select a sub-picture using viewport information of a user, interaction related feedback information, and the like and transmit related tracks. Alternatively, the transmission device may transmit a plurality of sub-picture tracks and select at least one sub-picture (sub-picture track) using the viewport information of the user, the interaction related feedback information, and the like.

The reception device analyses the file to acquire sub-picture bitstreams and sub-picture composition information (S2650) and decodes the sub-picture bitstreams (S2660). The reception device maps a decoded sub-picture to a composed picture (original picture) region based on the sub-picture composition information (S2670). The reception device renders the mapped composed picture (S2680). In this case, the reception device can perform a rectilinear projection process of mapping a part of a spherical surface corresponding to the viewport of the user to a viewport plane.

Figure 27:
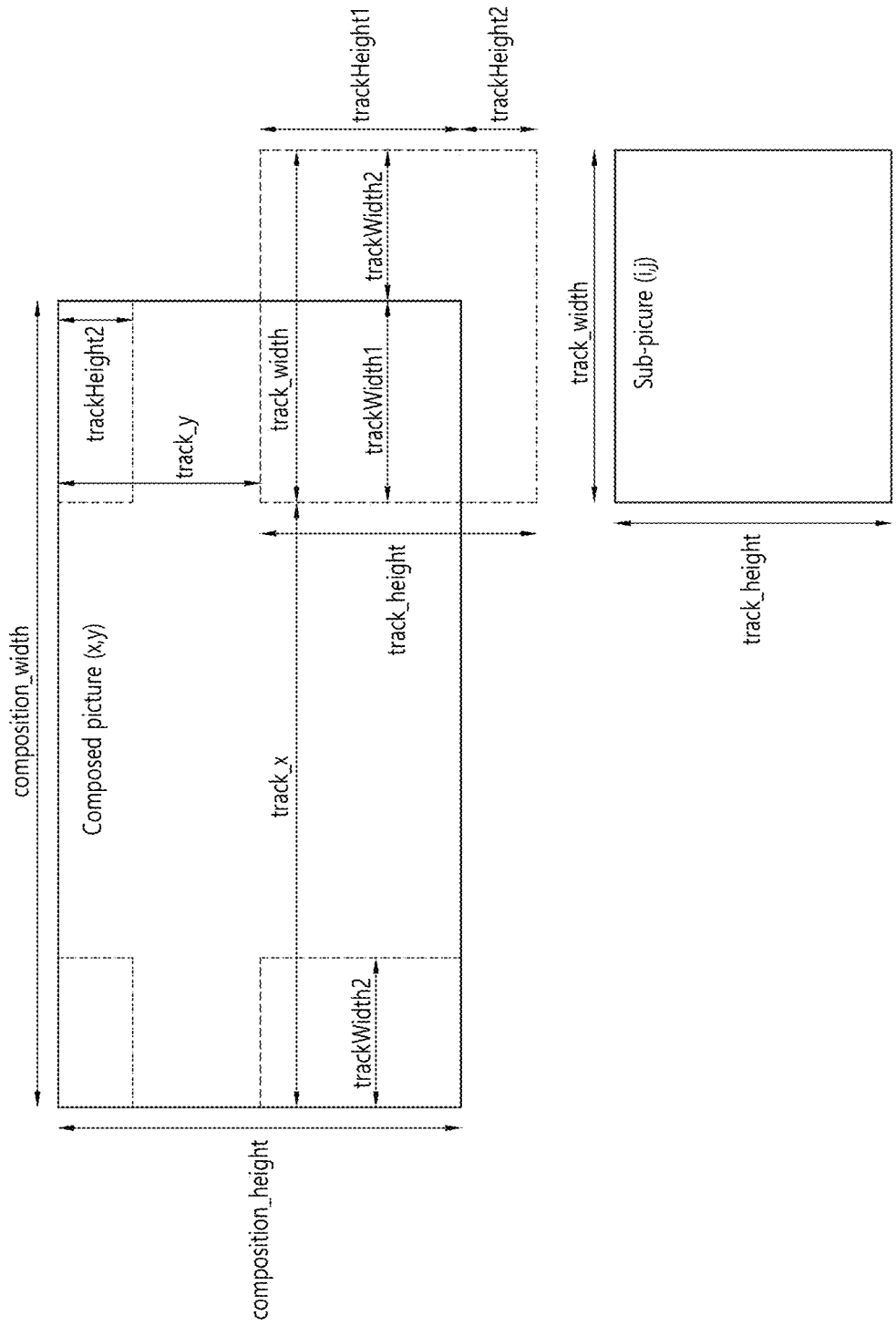
FIG. 27 illustrates a sub-picture composition according to the present disclosure.

According to the present disclosure, the aforementioned sub-picture can include regions that do not spatially neighbour on a composed 2D picture as sub-picture regions, as shown in FIG. 27. In step S2610, a sub-picture can be derived by extracting a region corresponding to a position (track_x, track_y) and a size (width, height) provided by the sub-picture composition information for a pixel (x, y) constituting the composed picture. In this case, a pixel position (i, j) in the sub-picture can be derived as shown in the following table 1.

TABLE 1

```
if (track_x+track_width > composition_width) {
    trackWidth1 = composition_width − track_x;
    trackWidth2 = track_width − trackWidth1
} else {
    trackWidth1 = track_width
    trackWidth2 = 0
}
if (track_y+track_height > composition_height) {
    trackHeight1 = composition_height − track_y;
    trackHeight2 = track_height − trackHeight1
} else {
    trackHeight1 = track_height
    trackHeight2 = 0
}
for (y=track_y; y<trackHeight1; y++) {
    for (x=track_x; x<trackWidth1; x++) {
        i = x − track_x
        j = y − track_y
    }
```

TABLE 1-continued

```
    for (x=0; x<trackWidth2; x++) {
        i = x
        j = y − track_y
    }
}
for (y=0; y<trackHeight2; y++) {
    for (x=track_x; x<trackWidth1; x++) {
        i = x − track_x
        j = y
    }
    for (x=0; x<trackWidth2; x++) {
        i = x
        j = y
    }
}
```

Further, in step S2680, the position (x, y) of the pixel in the composed picture which is mapped to the position (i, j) of the pixel constituting the sub-picture can be derived as shown in the following table 2.

TABLE 2

```
for (j=0; j<track_height; j++) {
    for (i=0; i<track_width; i++) {
        x = track_x + i
        y = track_y + j
        if ( x >= composition_width)
            x −= composition_width
        if (y >= composition_height)
            y −= composition_height
    }
}
```

As described above, the pixel position (i, j) in the sub-picture can be mapped to the pixel position (x, y) in the composed picture. When (x, y) deviates from the boundary of the composed picture, the position can be connected to the left of the composed picture when it deviated to the right and connected to the top of the composed picture when it deviates downward, as shown in FIG. 27.

Figure 28:
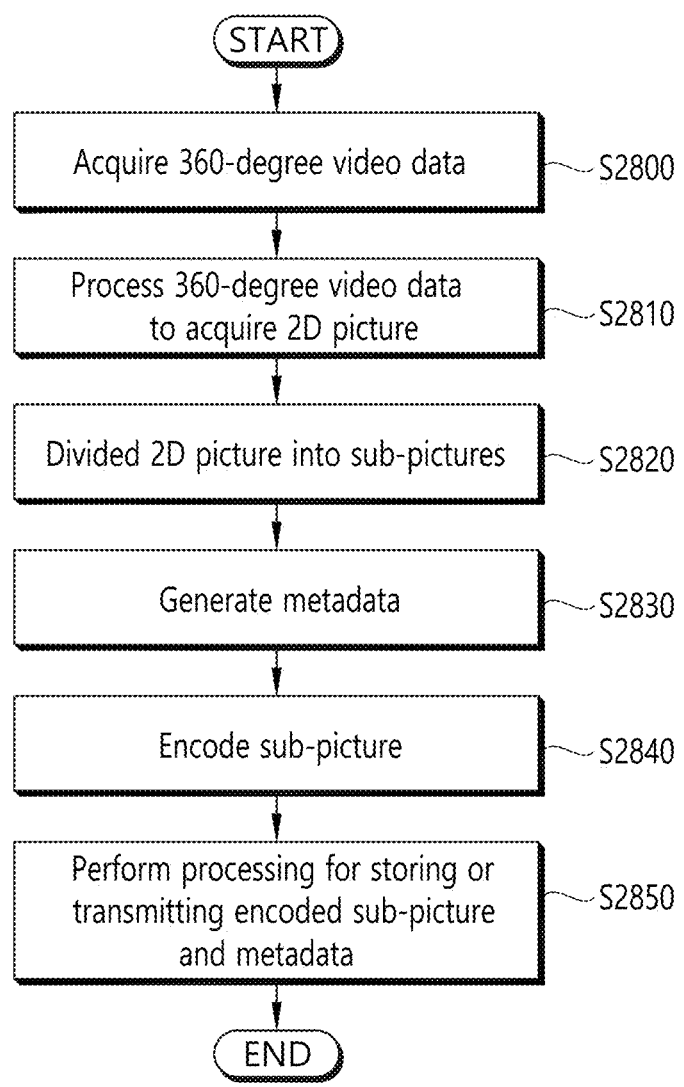
FIG. 28 schematically illustrates a 360-degree video data processing method performed by a 360-degree video transmission device according to the present disclosure.

FIG. 28 schematically illustrates a 360-degree video data processing method performed by the 360-degree video transmission device according to the present disclosure. The method illustrated in FIG. 28 can be performed by the 360-degree video transmission device illustrated in FIG. 5.

The 360-degree video transmission device acquires 360-degree video data (S2800). Here, the 360-degree video data may be an image captured using at last one 360-degree camera or an image generated or synthesize through an image processing device such as a computer.

The 360-degree video transmission device processes the 360-degree video data to acquire a 2D picture (S2810). The acquired image may be mapped to a single 2D picture through stitching and projection. In this case, the aforementioned region-wise packing process may be optionally performed. Here, the 2D picture may include the aforementioned original picture, projected picture/packed picture and composed picture.

The 360-degree video transmission device divides the 2D picture to derive sub-pictures (S2820). The sub-pictures can be independently processed. The 360-degree video transmission device can generate and/or use sub-picture composition information. The sub-picture composition information can be included in metadata.

Each sub-picture may include a plurality of sub-picture regions and the sub-picture regions may not spatially neighbor on the 2D picture. The sub-picture regions may spatially neighbor on a 3D space (spherical surface) on which they will be presented or rendered.

Metadata for the 360-degree video data is generated (S2830). The metadata may include various types of information proposed in the present disclosure.

For example, the metadata may include positional information of each sub-picture on the 2D picture. When the 2D picture is a packed picture derived through a region-wise packing process, the positional information of the sub-picture may include information indicating the horizontal coordinate of the left end of the sub-picture, information indicating the vertical coordinate of the top end of the sub-picture, information indicating the width of the sub-picture, and information indicating the height of the sub-picture based on the coordinates of the packed picture. The positional information of the sub-picture may further include information indicating the width of the packed picture and information indicating the height of the packed picture. For example, the positional information of the sub-picture may be included in RegionOriginalCoordinateBox contained in the metadata.

Further, at least one sub-picture track can be generated through S2850 which will be described later, and the metadata can include positional information of sub-pictures and track ID information associated with the sub-pictures. For example, the positional information of sub-pictures and the track ID information associated with the sub-pictures can be included in RegionToTrackBox contained in the metadata. Further, a file including a plurality of sub-picture tracks may be generated through the aforementioned step of performing processing for storage or transmission, and the metadata may include a video parameter set (VPS), a sequence parameter set (SPS) or a picture parameter set (PPS) associated with the sub-pictures, as illustrated in FIG. 19.

Alternatively, the positional information of the sub-pictures may be included in an SEI message, and the SEI message may include information indicating the horizontal coordinate of the left end of each sub-picture, information indicating the vertical coordinate of the top end of the sub-picture, information indicating the width of the sub-picture, and information indicating the height of the sub-picture based on the coordinates of the 2D picture in luma sample units. The SEI message may further include information indicating the number of bytes of the positional information of the sub-picture, as illustrated in FIG. 17.

The sub-pictures may include a plurality of sub-picture regions. In this case, the metadata may include sub-picture region information, the sub-picture region information may include positional information of the sub-picture regions and information on correlation between the sub-picture regions. The sub-picture regions may be indexed in a raster scan order. As illustrated in FIG. 21, the correlation information may include at least one piece of information indicating the uppermost rows of respective sub-picture regions in the sub-pictures and information indicating the leftmost columns of the respective sub-picture regions in the sub-pictures.

The positional information of each sub-picture may include information indicating the horizontal coordinate of the left end of the sub-picture, information indicating the vertical coordinate of the top end of the sub-picture, information indicating the width of the sub-picture, and information indicating the height of the sub-picture based on the coordinates of the 2D picture, the range of values of the information indicating the width of the sub-picture may be 1 to the width of the 2D picture, and the range of values of the information indicating the height of the sub-picture may be 1 to the height of the 2D picture. When "the horizontal coordinate of the left end of the sub-picture"+"the width of the sub-picture" is greater than the width of the 2D picture, the sub-picture can include the plurality of sub-picture regions. When "the vertical coordinate of the top end of the sub-picture"+"the height of the sub-picture" is greater than the height of the 2D picture, the sub-picture can include the plurality of sub-picture regions.

The 360-degree video transmission device encodes at least one of the sub-pictures (S2840). The 360-degree video transmission device may select and encode some of the plurality of sub-picture or encode all of the plurality of sub-pictures. The plurality of sub-pictures may be independently coded.

The 360-degree video transmission device performs processing for storing or transmitting the at least one encoded sub-picture and the metadata (S2850). The 360-degree video transmission device can encapsulate the at least one encoded sub-picture and/or the metadata in the form of a file. The 360-degree video transmission device may encapsulate the at least one encoded sub-picture and/or the metadata in a file format such as ISOBMFF or CFF or process the same in the form of a DASH segment in order to store or transmit the at least one encoded sub-picture and/or the metadata. The 360-degree video transmission device may contain the metadata in a file format. For example, the metadata may be contained in boxes of various levels in the ISOBMFF file format or contained as data in a separate track in a file. The 360-degree video transmission device can perform processing for transmission on the encapsulated file according to a file format. The 360-degree video transmission device can process the file according to any transmission protocol. The processing for transmission may include processing for delivery through a broadcast network and processing for delivery through a communication network such as broadband. Further, the 360-degree video transmission device may perform processing for transmission on the metadata. The 360-degree video transmission device can transmit the processed 360-degree video data and metadata through a broadcast network and/or a broadband.

Figure 29:
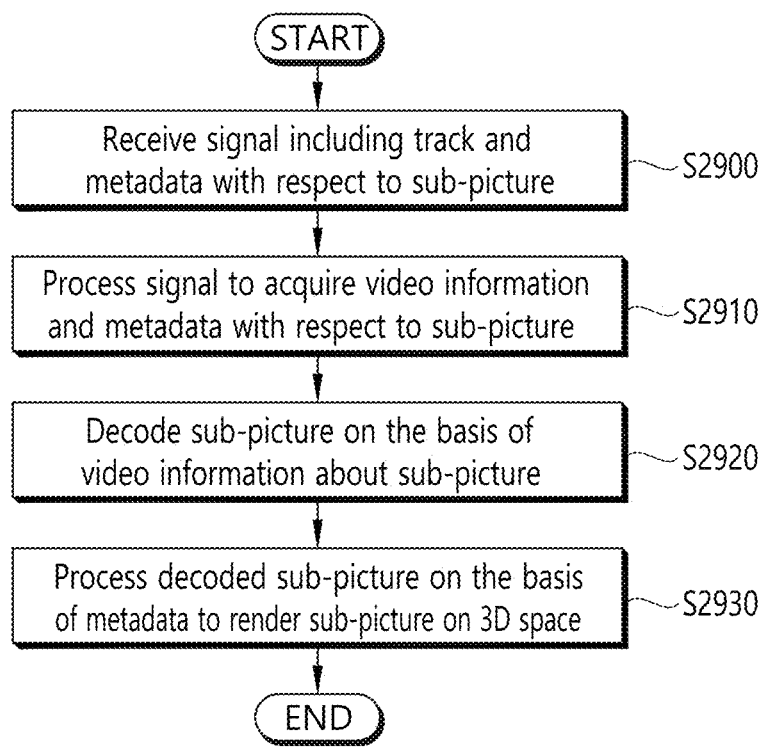
FIG. 29 schematically illustrates a 360-degree video data processing method performed by a 360-degree video reception device according to the present disclosure.

FIG. 29 schematically illustrates a 360-degree video data processing method performed by the 360-degree video reception device according to the present disclosure. The method illustrated in FIG. 29 can be performed by the 360-degree video reception device illustrated in FIG. 6.

The 360-degree video reception device receives a signal including a track and metadata with respect to a sub-picture (S2900). The 360-degree video reception device may receive video information and the metadata with respect to the sub-picture signaled from the 360-degree video transmission device through a broadcast network. The 360-degree video reception device may receive the video information and the metadata with respect to the sub-picture through a communication network such as a broadband or a storage medium. Here, the sub-picture may be located on a packed picture or a projected picture.

The 360-degree video reception device processes the signal to acquire the video information and the metadata with respect to the sub-picture (S2910). The 360-degree video reception device can perform processing according to a transmission protocol on the video information and the metadata with respect to the received sub-picture. Further, the 360-degree video reception device can perform a reverse process of the aforementioned processing for transmission performed by the 360-degree video transmission device.

The received signal can include a track with respect to at least one sub-picture. When the received signal includes tracks with respect to a plurality of sub-pictures, the 360-degree video reception device can select some (including one) of the plurality of sub-pictures. In this case, viewport information may be used.

The sub-picture may include a plurality of sub-picture regions and the sub-picture regions may not spatially neighbor on the 2D picture. The sub-picture regions may spatially neighbor on a 3D space (spherical surface) on which they will be presented or rendered.

The metadata may include various types of information proposed in the present disclosure.

For example, the metadata may include positional information of the sub-picture on the 2D picture. When the 2D picture is a packed picture derived through a region-wise packing process, the positional information of the sub-picture may include information indicating the horizontal coordinate of the left end of the sub-picture, information indicating the vertical coordinate of the top end of the sub-picture, information indicating the width of the sub-picture, and information indicating the height of the sub-picture based on the coordinates of the packed picture. The positional information of the sub-picture may further include information indicating the width of the packed picture and information indicating the height of the packed picture. For example, the positional information of the sub-picture may be included in RegionOriginalCoordinateBox contained in the metadata.

The metadata can include positional information of the sub-picture and track ID information associated with the sub-picture. For example, the positional information of the sub-picture and the track ID information associated with the sub-picture can be included in RegionToTrackBox contained in the metadata. Further, a file including a plurality of sub-picture tracks may be generated through the aforementioned step of performing processing for storage or transmission, and the metadata may include a video parameter set (VPS), a sequence parameter set (SPS) or a picture parameter set (PPS) associated with the sub-pictures, as illustrated in FIG. 19.

Alternatively, the positional information of the sub-picture may be included in an SEI message, and the SEI message may include information indicating the horizontal coordinate of the left end of the sub-picture, information indicating the vertical coordinate of the top end of the sub-picture, information indicating the width of the sub-picture, and information indicating the height of the sub-picture based on the coordinates of the 2D picture in luma sample units. The SEI message may further include information indicating the number of bytes of the positional information of the sub-picture, as illustrated in FIG. 17.

The sub-picture may include a plurality of sub-picture regions. In this case, the metadata may include sub-picture region information, the sub-picture region information may include positional information of the sub-picture regions and information on correlation between the sub-picture regions. The sub-picture regions may be indexed in a raster scan order. As illustrated in FIG. 21, the correlation information may include at least one of information indicating the uppermost row of each sub-picture region in the sub-picture and information indicating the leftmost column of each sub-picture region in the sub-picture.

The positional information of the sub-picture may include information indicating the horizontal coordinate of the left end of the sub-picture, information indicating the vertical coordinate of the top end of the sub-picture, information indicating the width of the sub-picture, and information indicating the height of the sub-picture based on the coordinates of the 2D picture, the range of values of the information indicating the width of the sub-picture may be 1 to the width of the 2D picture, and the range of values of the information indicating the height of the sub-picture may be 1 to the height of the 2D picture. When "the horizontal coordinate of the left end of the sub-picture"+"the width of the sub-picture" is greater than the width of the 2D picture, the sub-picture can include the plurality of sub-picture regions. When "the vertical coordinate of the top end of the sub-picture"+"the height of the sub-picture" is greater than the height of the 2D picture, the sub-picture can include the plurality of sub-picture regions.

The 360-degree video reception device decodes the sub-picture based on the video information about the sub-picture (S2920). The 360-degree video reception device can independently decode the sub-picture based on the video information about the sub-picture. Further, when video information about a plurality of sub-pictures is input, the 360-degree video reception device can only a specific sub-picture based on acquired viewport related metadata.

The 360-degree video reception device process the decoded sub-picture based on the metadata to render the sub-picture on a 3D space (S2930). The 360-degree video reception device can map the decoded sub-picture to the 3D space based on the metadata. In this case, the 360-degree video reception device can map and render the decoded sub-picture to/on the 3D space by performing coordinate conversion based on positional information of the sub-picture and/or sub-picture regions according to the present disclosure.

The above-described steps may be omitted or replaced by other steps performing similar/identical operations according to embodiments.

The 360-degree video transmission device according to an embodiment of the present disclosure may include the aforementioned data input unit, stitcher, signaling processor, projection processor, data encoder, transmission processor, and/or transmitter. Each internal component has been described above. The 360-degree video transmission device and the internal components thereof according to an embodiment of the present disclosure can perform the above-described embodiments of the 360-degree video transmission method of the present disclosure.

The 360-degree video reception device according to an embodiment of the present disclosure may include the aforementioned receiver, reception processor, data decoder, signaling parser, re-projection processor and/or renderer. Each internal component has been described above. The 360-degree video reception device and the internal components thereof according to an embodiment of the present disclosure can perform the above-described embodiments of the 360-degree video reception method of the present disclosure.

The internal components of the aforementioned devices may be processors which perform consecutive processes stored in a memory or hardware components configured as hardware. The components may be located inside/outside the devices.

The above-described modules may be omitted or replaced by other modules performing similar/identical operations according to embodiments.

The aforementioned parts, modules or units may be processors or hardware parts which perform consecutive processes stored in a memory (or storage unit). Each step described in the above-described embodiments may be performed by a processor or a hardware part. Each module/block/unit described in the above-described embodiments can operate as a hardware/processor. Further, the methods proposed by the present disclosure can be executed as code. This code can be written on a storage medium readable by a processor and read by a processor provided by a device.

Although the methods are described as a series of steps or blocks based on flowcharts in the above-described embodiments, the present disclosure is not limited to the order of steps and certain steps may be performed in different order from the aforementioned one or performed simultaneously. Further, those skilled in the art can understand that steps in flowcharts are not exclusive and other steps may be included or one or more steps of a flowchart may be omitted without affecting the scope of the present disclosure.

When the embodiments of the present disclosure are implemented in software, the above-described method may be implemented by modules (processes, functions, and so on) that perform the functions described above. Such modules may be stored in a memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A 360-degree video processing method performed by a 360-degree video transmission device, comprising:
   acquiring 360-degree video data;
   projecting and packing the 360-degree video data into a 2D picture;
   dividing the 2D picture into one or more sub-pictures representing spatial areas of the 360-degree video data;
   generating metadata with respect to the 360-degree video data;
   encoding the one or more sub-pictures; and
   encapsulating the one or more sub-pictures and the metadata into a file,
   wherein the metadata includes packing information including guard band information for regions for the one or more sub-pictures,
   wherein the file includes one or more tracks for the metadata and a group of tracks having an indicator for the group of tracks carries sub-picture region information including:
   position information for representing horizontal information of a top-left corner of samples for the one or more sub-pictures, vertical information of the top-left corner of the samples for the one or more sub-pictures, a width for the one or more sub-pictures, and a height for the one or more sub-pictures.

2. A 360-degree video processing method performed by a 360-degree video reception device, comprising:
   receiving a file including a track with respect to one or more sub-pictures representing spatial areas of 360-degree video data and metadata;
   decapsulating the one or more sub-pictures and the metadata from the file,
   wherein the metadata includes packing information including guard band information for regions for the one or more sub-pictures,
   wherein the file includes one or more tracks for the metadata and a group of tracks having an indicator for the group of tracks carries sub-picture region information;
   decoding the one or more sub-pictures; and
   rendering the one or more sub-pictures,
   wherein the sub-picture region information includes:
   positional information for representing horizontal information of a top-left corner of samples for the one or more sub-pictures, a vertical information of the top-left corner of the samples for the one or more sub-pictures, a width for the one or more sub-pictures, and information representing a height for the one or more sub-pictures.

3. The 360-degree video processing method of claim 1, wherein a region, among regions of the sub-picture, located in an area which is located beyond a width of the 2D picture is displaced as to be adjacent to a left boundary of the 2D picture when 'a horizontal coordinate of the top-left corner of the samples in the sub-picture' plus 'the width of the sub-picture' is greater than the width of the 2D picture, and
   wherein a region, among the regions of the sub-picture, located in an area which is located beyond a height of the 2D picture is displaced as to be adjacent to a top boundary of the 2D picture when 'a vertical coordinate of the top-left corner of the samples in the sub-picture' plus 'the height of the sub-picture' is greater than the height of the 2D picture.

4. The 360-degree video processing method of claim 1, wherein when a value of a horizontal coordinate x of a pixel in the sub-picture is greater than a width of the 2D picture, the corresponding pixel is located according to a coordinate represented by 'the value of the horizontal coordinate x' minus 'a width of the 2D picture', and
   wherein when a value of a vertical coordinate y of a pixel in the sub-picture is greater than a height of the 2D picture, the corresponding pixel is located according to a coordinate represented by 'the value of the vertical coordinate y' minus 'a height of the 2D picture'.

5. The 360-degree video processing method of claim 2, wherein a region, among regions of the sub-picture, located in an area which is located beyond a width of the 2D picture is displaced as to be adjacent to a left boundary of the 2D picture when 'a horizontal coordinate of the top-left corner of the samples in the sub-picture' plus 'the width of the sub-picture' is greater than a width of the 2D picture, and
   wherein a region, among the regions of the sub-picture, located in an area which is located beyond a height of the 2D picture is displaced as to be adjacent to a top boundary of the 2D picture when 'a vertical coordinate of the top-left corner of the samples in the sub-picture' plus 'the height of the sub-picture' is greater than a height of the 2D picture.

6. The 360-degree video processing method of claim 2, wherein when a value of a horizontal coordinate x of a pixel in the sub-picture is greater than a width of the 2D picture, the corresponding pixel is located according to a coordinate represented by 'the value of the horizontal coordinate x' minus 'a width of the 2D picture', and
   wherein when a value of a vertical coordinate y of a pixel in the sub-picture is greater than a height of the 2D picture, the corresponding pixel is located according to a coordinate represented by 'the value of the vertical coordinate y' minus 'the height of the 2D picture'.

7. A 360-degree video reception device, comprising:
   a receiver configured to receive a file including a track with respect to one or more sub-pictures representing spatial areas of 360-degree video data and metadata;
   a decapsulator configured to decapsulate the one or more sub-pictures and the metadata from the file;

wherein the metadata includes packing information including guard band information for regions for the one or more sub-pictures,
wherein the file includes one or more tracks for the metadata and a group of tracks having an indicator for the group of tracks carries sub-picture region information;
a data decoder configured to decode the one or more sub-pictures; and
a renderer configured to render the one or more sub-pictures,
wherein the sub-picture region information includes:
positional information for representing horizontal information of a top-left corner of samples for the one or more sub-pictures, information representing vertical information of the top-left corner of the samples for the one or more sub-pictures, information representing a width for the one or more sub-pictures, and information representing a height for the one or more sub-pictures.

8. The 360-degree video reception device of claim 7, wherein a region, among regions of the sub-picture, located in an area which is located beyond a width of the 2D picture is displaced as to be adjacent to a left boundary of the 2D picture when 'a horizontal coordinate of the top-left corner of the samples in the sub-picture' plus 'the width of the sub-picture' is greater than the width of the 2D picture, and
wherein a region, among the regions of the sub-picture, located in an area which is located beyond a height of the 2D picture is displaced as to be adjacent to a top boundary of the 2D picture when 'a vertical coordinate of the top-left corner of the samples in the sub-picture' plus 'the height of the sub-picture' is greater than the height of the 2D picture.

9. The 360-degree video reception device of claim 7, wherein when a value of a horizontal coordinate x of a pixel in the sub-picture is greater than a width of the 2D picture, the corresponding pixel is located according to a coordinate represented by 'the value of the horizontal coordinate x' minus 'a width of the 2D picture', and
wherein when a value of a vertical coordinate y of a pixel in the sub-picture is greater than a height of the 2D picture, the corresponding pixel is located according to a coordinate represented by 'the value of the vertical coordinate y' minus 'a height of the 2D picture'.

10. A 360-degree video transmission device, comprising:
an acquirer configured to acquire 360-degree video data;
a processor configured to project and pack the 360-degree video data into a 2D picture,
divide the 2D picture into one or more sub-pictures representing spatial areas of the 360-degree video data, and
generate metadata with respect to the 360-degree video data;
an encoder configured to encode the one or more sub-pictures; and
an encapsulator configured to encapsulate the one or more sub-pictures and the metadata into a file,
wherein the metadata includes packing information including guard band information for regions for the one or more sub-pictures,
wherein the file includes one or more tracks for the metadata and a group of tracks having an indicator for the group of tracks carries sub-picture region information including:
position information for representing horizontal information of a top-left corner of samples for the one or more sub-pictures, vertical information of the top-left corner of the samples for the one or more sub-pictures, a width for the one or more sub-pictures, and a height for the one or more sub-pictures.

* * * * *